(12) United States Patent
Nelson et al.

(10) Patent No.: US 9,144,203 B2
(45) Date of Patent: Sep. 29, 2015

(54) CONTINUOUS-FEED LINEAR IRRIGATOR WITH SEPARATE OR INTEGRATED DOCKING DEVICES AND RELATED METHOD

(75) Inventors: Craig B. Nelson, Walla Walla, WA (US); Mark A. Bauman, College Place, WA (US); Rex D. Ness, College Place, WA (US); Joseph Daniel Sinden, Walla Walla, WA (US); Chad Daniel Leinweber, Walla Walla, WA (US)

(73) Assignee: PROJECT 088 LLC, Walla Walla, WA (US)

( * ) Notice: Subject to any disclaimer, the term of this patent is extended or adjusted under 35 U.S.C. 154(b) by 1485 days.

(21) Appl. No.: 12/466,743

(22) Filed: May 15, 2009

(65) Prior Publication Data

US 2010/0288846 A1    Nov. 18, 2010

(51) Int. Cl.
| | |
|---|---|
| B05B 3/00 | (2006.01) |
| B05B 3/18 | (2006.01) |
| B05B 17/00 | (2006.01) |
| B05B 9/00 | (2006.01) |
| B05B 15/06 | (2006.01) |
| A01G 25/09 | (2006.01) |

(52) U.S. Cl.
CPC .................... *A01G 25/097* (2013.01)

(58) Field of Classification Search
CPC ... A01G 25/097; A01G 25/09; A01M 7/0082; B62D 11/10
USPC ......... 239/749, 722, 723, 148, 149, 281, 726, 239/1
See application file for complete search history.

(56) References Cited

U.S. PATENT DOCUMENTS

| | | | |
|---|---|---|---|
| 1,142,448 | A | 6/1915 | Lord |
| 1,651,582 | A | 12/1927 | Buckner |

(Continued)

FOREIGN PATENT DOCUMENTS

| | | |
|---|---|---|
| CA | 924353 | 4/1973 |
| EP | 0008182 | 2/1980 |

(Continued)

OTHER PUBLICATIONS

Sinden et al., "Power-Assisted Docking Station for Mobile Irrigation Apparatus", U.S. Appl. No. 11/413,029, filed Apr. 28, 2006, pending.

*Primary Examiner* — Jason Boeckmann
*Assistant Examiner* — Steven M Cernoch
(74) *Attorney, Agent, or Firm* — Nixon & Vanderhye P.C.

(57) ABSTRACT

A linear irrigation system includes a linear irrigator movable in a first direction along a path of travel and including plural towers supporting a truss assembly extending laterally in a direction substantially perpendicular to the path of travel. The truss assembly carries a plurality of sprinklers connected to a water supply pipe. A plurality of hydrants are spaced along the water supply pipe, each hydrant having a valve, and a pair of laterally adjacent trolleys are mounted on an elongated frame for movement in two opposite directions, each trolley having a docking station and hydrant valve actuator, the docking stations resiliently suspended from said trolleys for movement in at least three mutually perpendicular directions and adapted to engage and disengage, successively, the plurality of hydrants on the supply pipe extending below and between the pair of trolleys. The trolleys and docking stations may be carried on a mobile cart or incorporated into the linear irrigator.

9 Claims, 23 Drawing Sheets

(56) References Cited

U.S. PATENT DOCUMENTS

| | | |
|---|---|---|
| 1,984,531 A | 12/1934 | Kind et al. |
| 2,122,079 A | 6/1938 | Wilson |
| 2,474,071 A | 6/1949 | Stetson |
| 2,750,228 A | 6/1956 | Engel |
| 3,281,080 A | 10/1966 | Hogg |
| 3,321,138 A | 5/1967 | Curry |
| 3,381,893 A | 5/1968 | Smith, Jr. et al. |
| 3,444,941 A | 5/1969 | Purtell |
| 3,463,175 A | 8/1969 | Rogers |
| 3,575,200 A | 4/1971 | Imeson |
| 3,592,220 A | 7/1971 | Reinke |
| 3,608,825 A | 9/1971 | Reinke |
| 3,608,827 A | 9/1971 | Kinkead |
| 3,679,135 A | 7/1972 | Grosch |
| 3,710,818 A | 1/1973 | Imeson |
| 3,729,016 A | 4/1973 | Von Linsowe |
| 3,729,141 A | 4/1973 | Cornelius |
| 3,741,238 A | 6/1973 | Lacey |
| 3,970,102 A | 7/1976 | Harvey |
| 3,972,477 A | 8/1976 | Laureau |
| 3,984,052 A | 10/1976 | Di Palma |
| 4,003,519 A | 1/1977 | Kruse et al. |
| 4,036,436 A | 7/1977 | Standal |
| 4,149,676 A | 4/1979 | Wieck |
| 4,159,080 A | 6/1979 | Standal |
| 4,168,802 A * | 9/1979 | Hurt .................... 239/172 |
| 4,182,493 A * | 1/1980 | Murray ................. 239/740 |
| 4,192,335 A | 3/1980 | Standal |
| 4,204,642 A | 5/1980 | Hunter |
| 4,219,043 A | 8/1980 | Zimmerer et al. |
| 4,240,461 A | 12/1980 | Harvey |
| 4,252,275 A | 2/1981 | Standal |
| 4,265,404 A | 5/1981 | Hunter |
| 4,274,584 A | 6/1981 | Noble |
| 4,295,607 A | 10/1981 | Noble |
| 4,350,295 A | 9/1982 | Gheen |
| 4,352,460 A | 10/1982 | Purtell |
| 4,412,655 A | 11/1983 | Noble |
| 4,413,783 A | 11/1983 | Ostrom et al. |
| 4,421,274 A | 12/1983 | Noble |
| 4,442,974 A | 4/1984 | Noble |
| 4,442,976 A * | 4/1984 | Noble .................... 239/740 |
| 4,467,962 A | 8/1984 | Noble |
| 4,491,274 A | 1/1985 | Noble |
| 4,522,338 A | 6/1985 | Williams |
| 4,553,699 A | 11/1985 | Bengtsson |
| 4,561,459 A | 12/1985 | Jackman |
| 4,609,147 A | 9/1986 | Chapman et al. |
| 4,723,714 A | 2/1988 | Lucas |
| 4,730,773 A | 3/1988 | Meyer |
| 4,809,910 A | 3/1989 | Meyer |
| 4,811,248 A | 3/1989 | Senoh et al. |
| 4,842,204 A | 6/1989 | Debruhl, Jr. |
| 4,877,189 A | 10/1989 | Williams |
| 5,080,290 A | 1/1992 | Ostrom |
| 5,340,078 A | 8/1994 | Dean |
| 5,810,051 A | 9/1998 | Campagna et al. |
| 6,125,868 A | 10/2000 | Murphy et al. |
| 6,431,475 B1 | 8/2002 | Williams |
| 7,140,563 B2 | 11/2006 | Sinden et al. |
| 7,300,004 B2 | 11/2007 | Sinden et al. |
| 7,510,132 B2 | 3/2009 | Sinden et al. |

FOREIGN PATENT DOCUMENTS

| | | |
|---|---|---|
| EP | 1044496 | 10/2000 |
| FR | 561667 | 10/1923 |
| GB | 2 026 293 | 2/1980 |
| SU | 434918 | 7/1974 |
| SU | 497984 | 1/1976 |
| SU | 516378 | 6/1976 |
| SU | 685220 | 9/1979 |
| SU | 1063343 | 12/1983 |
| SU | 1132868 A | 1/1985 |
| WO | WO 82/03964 | 11/1982 |
| WO | WO 87/00724 | 2/1987 |

* cited by examiner

CONTINUOUS-FEED LINEAR IRRIGATOR WITH SEPARATE OR INTEGRATED DOCKING DEVICES AND RELATED METHOD

This invention relates generally to linear irrigation machines and, more specifically, to an automatic hydrant docking system that continuously feeds water to a linear-move irrigation machine from successive hydrants spaced along a water supply pipe extending generally parallel to the direction of movement of the linear-move irrigation machine.

BACKGROUND OF THE INVENTION

Mobile irrigation machines having elevated boom or truss assemblies carrying multiple sprinklers are typically of the center-pivot type or the linear-move type. In a center-pivot machine, the elevated truss assembly pivots about an upright standpipe that supplies water to the sprinklers supported from the truss assembly. In a linear-move machine (referred to herein as a "linear irrigator"), the elevated truss assembly is carried on mobile, wheeled towers that move the machine along a substantially straight path that is generally perpendicular to the elevated boom or truss. Typically, a linear irrigator moves from one end of a field to the other and back again, sprinkling in one or both directions.

While linear irrigators can irrigate more area than center-pivot machines by reason of the resulting rectangularly-shaped irrigation pattern, linear irrigators have proven to be problematic in several respects. The most significant problem relates to the manner in which water is supplied to the machine. In some cases where the field is flat, the machine travels alongside an open ditch or canal from which water is continuously removed. Ditch water, however, typically contains significant amounts of dirt and/or debris that can clog the sprinkler nozzles. In other cases, one or more hoses are dragged by the machine the length of the field, requiring one or more manual attachment/detachment procedures and attendant issues of hose management. High pressure drops associated with such systems also lead to high energy costs. In still other cases, complex mechanisms have been proposed for automatic docking with hydrants spaced along the length of a water supply pipe. One of the problems with these latter arrangements is that the hydrant risers are held firmly in concrete or welded onto steel pipe, and misalignment with the docking mechanism can cause serious damage to the hydrant as well as to the docking mechanism. In some instances, the linear irrigator must be halted during an entire watering cycle at each successive hydrant. In others, continuous operation of the linear irrigator is said to be achieved, but the mechanisms employed to obtain continuity have been complex, costly and generally not commercially successful.

In commonly owned U.S. Pat. No. 7,300,004 a traveling sprinkler is disclosed that incorporates a "floating" docking station for automatically engaging and disengaging hydrant valves on a supply pipe. In commonly owned U.S. Pat. No. 7,140,563, a linear irrigator is disclosed that incorporates a similar docking station. A variation of that docking station that adds power actuators to assist in required lateral and vertical adjustments is disclosed in commonly-owned pending U.S Published Application No. 2006/0192037. These docking stations can be utilized with minor adaptations in the present invention. For the most part, in the patents and application identified above, only one docking station is utilized, so that the supply of water to the sprinklers is interrupted when the traveling sprinkler or linear irrigator moves from one hydrant to the next. In one instance, a pair of docking stations is used in a continuous water supply arrangement, but separate, parallel supply pipes are required.

Accordingly, there remains a need for a relatively simple and reliable hydrant docking arrangement for a linear irrigator that can engage and disengage successive hydrants in a continuous manner as the linear machine moves along its path of travel.

BRIEF DESCRIPTION OF THE INVENTION

In one exemplary but nonlimiting embodiment, an automatic docking station (ADS) is carried on each of two opposite sides of a four-wheel cart driven alongside a linear irrigator. Each ADS is in fluid communication with a manifold connected to the linear irrigator truss assembly so as to supply water to the many sprinklers carried by (or suspended from) the truss assembly. The wheels of the cart are driven by electric, hydraulic or pneumatic motors, and a controller on the cart is in electrical communication with the linear irrigator to ensure coordinated and synchronized movements. The pair of ADS units is utilized to automatically engage and disengage each successive hydrant along a water supply pipe in a continuous manner. More specifically, each ADS is arranged to move relative to the other ADS and to the cart, so that at least one ADS is engaged with a hydrant and supplying water to the linear irrigator at all times during a course of travel from, for example, one end of a field to the opposite end of the field.

Each ADS is supported and controlled so as to reliably and effectively capture a hydrant; open the hydrant water-supply valve to permit water to be supplied to the one or more sprinklers on the linear irrigator over a predetermined distance of travel; close the valve; disengage from the hydrant and move to another hydrant. In order to ensure continuity of water supply to the linear irrigator, there is at least a momentary overlap when both ADS units are engaged with adjacent hydrants and both hydrant valves are open. When one ADS is engaged, supplying water, the other is shut off after the momentary overlap, through the use of a check valve or other type of isolation valve, In the exemplary embodiment, the ADS units per se are substantially as described in the above-identified patents and pending published application. Briefly, each ADS is formed by a pair of housings sandwiched about a hydrant valve actuator. The two housings support multiple pairs of guide wheels adapted to engage a round plate or flange on the respective hydrants. Guide wings, described further below, are provided on the forward and rearward ends of the ADS units to facilitate proper horizontal and vertical alignment with the hydrants. Additional related mechanical and electrical hardware is provided for precisely locating the ADS on the captured hydrant, thereby enabling both engagement of the valve actuator with the hydrant valve to open the valve, and subsequent disengagement to close the valve. As indicated above, each ADS has a check valve or other type of isolation valve to ensure that it is "off" when disengaged from a hydrant.

The guide wings mentioned above include two pair of vertically-oriented, angled guide wings, respectively mounted on the front and back of a trolley frame from which the ADS is suspended. The guide wings are used to achieve lateral alignment of the ADS with the various hydrants, while one pair of substantially horizontally-oriented front and back guide wings fixed to the ADS are used to achieve vertical alignment. In this regard, each ADS is operable in both forward and rearward directions of movement of the cart, with no change or adjustment in any of the component parts. For purposes of this disclosure, therefore, any use of "front" or "forward," etc. is intended to refer to the ends of the cart and/or ADS, etc. that lead in the direction of initial movement of the cart, i.e., along a path, for example, path $P_1$, as shown in FIG. 1. Use of "back" or "rearward," etc. is intended to refer to the opposite ends of the cart and/or ADS, etc. that trail in the movement along the path $P_1$, but that lead in movement in the opposite direction along the path $P_2$.

To ensure consistent and effective hydrant engagement via interaction with the above-described guide wings, each ADS is capable of several degrees of movement relative to a supporting trolley carried by the cart. More specifically, the docking component of each ADS is resiliently suspended for "floating" movement by elongated coil springs (or equivalents) and spring-loaded tie rods, enabling up and down (or vertical) movements, as well as front-to-back, side-to-side and compound movements, i.e., tilting and twisting movements, that may be required to dock with a hydrant.

Each ADS is supported on a trolley movable in opposite linear directions along respective laterally-spaced side beams of the cart frame as explained below. In addition, each ADS is movable laterally along a pair of trolley rails extending perpendicular to the side beams of the cart so as to permit a wide range of lateral adjustments for a similarly wide range of hydrant misalignment situations.

Because the trolleys are located substantially along the centerline of the cart, each trolley is also configured to permit a respective ADS to be raised and lowered relative to the cart frame so that, for example, a rearward (or second) ADS unit 126 is able to "leapfrog" a forward (or first) ADS unit 124 as the latter moves in a rearward direction. Note that the "rearward" movement is to be understood as movement relative to the cart frame since the forward ADS is docked to the stationary hydrant H1 while the cart continues to move forward. The leapfrog feature is significant in that it allows the rearward ADS 126 to move to a forward position on the cart, ready to engage the next successive hydrant H2 while ADS 124 remains engaged with hydrant H1 and moves rearwardly relative to the cart frame. Overlapping engagement of ADS 124 and ADS 126 with adjacent hydrants H1 and H2 ensures continuous supply of water to the linear irrigator. The leapfrog action is repeated as the linear irrigator moves along its path of travel. It is also noted that this leapfrogging action may be accomplished in either an up-and-down motion or a side-to-side motion. For simplicity, all descriptions herein will relate to vertical motion, but one skilled in the art will understand that either type of leapfrog action may be employed.

Another feature includes the incorporation of steering arms extending forwardly and rearwardly of the cart, each arm provided with plural follower wheels that engage the water supply pipe. Angular movement of the steering arms is sensed and input to the cart controller which can adjust the course of the cart as needed by varying the frequency to the cart's electric drive motors, thus enabling "skid-steering" of the cart. The cart could also be steered by furrow, buried wire, GPS or cable.

Another feature includes the use of a speed control arm that detects differential linear movement between the linear irrigator and the cart, and adjusts the speed of the cart accordingly.

Another feature relates to a unique cart suspension arrangement achieved by allowing relative movement between the side and end beams of the cart frame, thus permitting a degree of flexing or twisting of the frame as it traverses uneven ground, without affecting the operation of the ADS units.

Another feature relates to the management of ADS connection hoses as the ADS units move horizontally and vertically relative to the cart. In the exemplary embodiment, flexible guide chains enclose the connection hoses but allow rolling movements along confined paths in a controlled manner.

In another exemplary but nonlimiting embodiment, the docking apparatus may be incorporated into any one of the towers of the linear irrigator (for example, the end tower or the center tower), eliminating the need for a separate cart.

Accordingly, in one exemplary but nonlimiting embodiment, the invention relates to a method for continuously supplying water to a linear irrigator from a plurality of hydrants and associated hydrant valves spaced along a path of travel of the linear irrigator, the method comprising: (a) driving the linear irrigator in a first direction along the path of travel; (b) providing a pair of docking stations supported on an elongated framework for movement with the linear irrigator, each docking station equipped with a hydrant valve actuator and a hose for connecting the hydrant valve to the linear irrigator, and each docking station independently moveable relative to the elongated framework; (c) moving a first of the docking stations into engagement with a first of the hydrants and opening a first hydrant valve with the hydrant valve actuator to thereby supply water to the linear irrigator from the first hydrant; (d) continuing to move the elongated framework in the first direction while the first docking station is engaged with the first hydrant so that, relative to the elongated framework, the first docking station is moving in a second opposite direction; (e) as the first docking station moves in the second, opposite direction, moving a second of the pair of docking stations in the first direction toward a second hydrant, and enabling the second docking station to leapfrog the first docking station; (f) moving the second docking station into engagement with the second hydrant and opening the second hydrant valve with a second hydrant valve actuator to thereby supply water to the linear irrigator from the second hydrant; (g) disengaging the first docking station from the first hydrant and moving the first docking station in the first direction toward a third hydrant, and, as the second docking station moves in the second opposite direction relative to the cart while engaged with the second hydrant, enabling the first docking station to leapfrog the second docking station; and (h) repeating steps (c) through (g) for engaging successive adjacent ones of the plurality of hydrants.

In another exemplary but nonlimiting aspect, the invention relates to a cart for feeding water substantially continuously to a linear irrigator from a plurality of hydrants and associated hydrant valves spaced along a path of travel of the linear irrigator, the cart comprising: a frame supported on wheels; a pair of laterally adjacent trolleys mounted for linear reciprocating movement in two opposite directions substantially along a longitudinal centerline of the cart, each trolley carrying a docking station and hydrant valve actuator, the docking stations resiliently suspended for movement in at least three mutually perpendicular directions and adapted to continuously engage and disengage, successively, the plurality of hydrants on a supply pipe extending below and between the pair of trolleys.

In another exemplary but nonlimiting aspect, the invention relates to a linear irrigation system comprising: a linear irrigator movable in a first direction along a path of travel and including plural towers supporting a truss assembly extending laterally in a direction substantially perpendicular to the path of travel, the truss assembly carrying a plurality of sprinklers connected to a water supply pipe; a plurality of hydrants spaced along the pipe, each hydrant having a valve; and a pair of laterally adjacent trolleys mounted on an elongated frame for movement in two opposite directions, each trolley having a docking station and hydrant valve actuator, the docking stations resiliently suspended from the trolleys for movement in at least three mutually perpendicular directions and adapted to continuously engage and disengage, successively, the plurality of hydrants on the supply pipe extending below and between the pair of trolleys.

In still another exemplary but nonlimiting aspect, the invention relates to an automatic and continuous docking system for a linear irrigator comprising a wheeled support frame; a pair of hydrant docking stations supported on the wheeled support frame for movement in a substantially common line of travel; first means for moving the respective docking stations in each of two opposite horizontal directions; and second means for moving the respective docking stations in each of two opposite vertical directions so as to enable one docking station to leapfrog the other docking station when the docking stations are moving in opposite horizontal directions relative to each other.

In still another exemplary embodiment, the invention relates to a linear irrigator comprising plural wheeled towers supporting one or more truss assemblies mounting a plurality of sprinklers, one of the plural towers incorporating a pair of laterally adjacent trolleys mounted for linear reciprocating movement in two opposite directions substantially along a direction of travel of the linear irrigator, each trolley carrying a docking station and hydrant valve actuator, the docking stations resiliently suspended for substantially free-floating movement, and adapted to continuously engage and disengage, successively, a plurality of hydrants on a supply pipe extending below and between the pair of trolleys.

The invention will now be described in detail in connection with the drawings identified below:

DETAILED DESCRIPTION OF THE DRAWINGS

Figure 1:
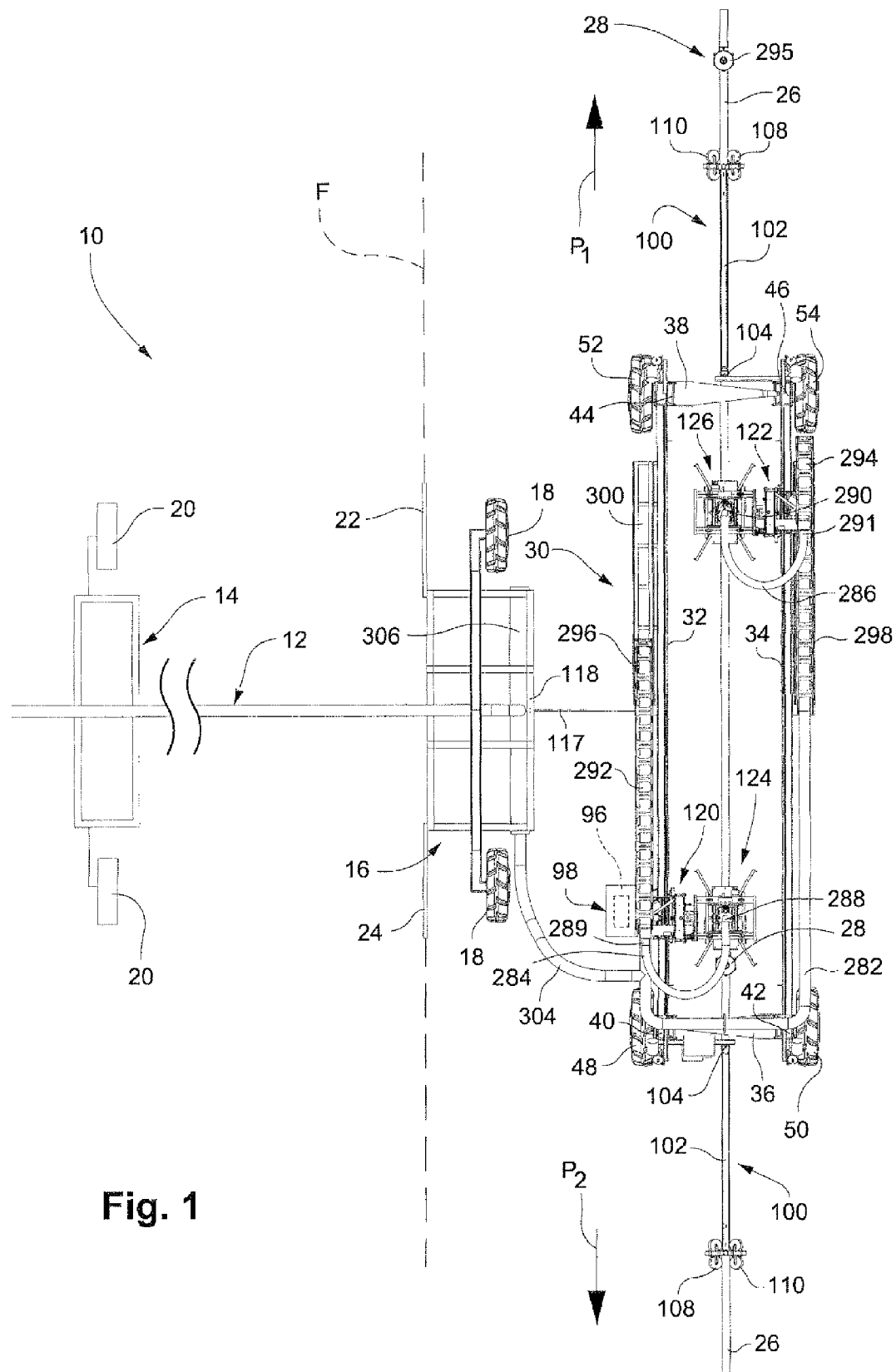
FIG. 1 is a partial top plan view of a linear irrigator and a cart incorporating a pair of ADS units in accordance with an exemplary but nonlimiting embodiment of the invention, with a first ADS in the lead position and a second ADS in a trailing position.

With reference initially to FIGS. 1-5, a linear irrigator 10 includes a schematically-illustrated main truss assembly 12 supported by several wheeled towers 14 (one shown) for movement in a forward direction along a linear path $P_1$, and/or in a rearward direction along an opposite linear path $P_2$. These paths extend substantially perpendicularly to the truss assembly 12, and substantially parallel to a water supply pipe 26. In an end-feed arrangement as shown, an end tower 16 is located at one end of the field, adjacent the supply pipe 26. (In a center feed arrangement, shown in FIG. 21, the supply pipe would lie under the center tower of the linear irrigator as discussed further herein.) In this example, the end tower 16 is also the drive tower, supplying the main source of power for driving the linear irrigator 10 along the path. The drive or end tower 16 typically includes an engine-driven generator (or a power cord) or a hydraulic pump for supplying power to the drive wheels 18, and separate electric motors (not shown) are often attached to the remaining towers 14 for driving the respective wheel pairs 20 as needed to maintain alignment with the drive or end tower 16. Other drive arrangements including the utilization of battery power and/or electric or hydraulic drive motors connected to a power source by a cable could be employed to drive the linear irrigator. Electronics on the linear irrigator (not shown) coordinates the various drive motors to move the machine as desired along the Paths $P_1$ and/or $P_2$.

Guide booms 22, 24 may extend in opposite directions from the drive or end tower 16 (parallel to the paths $P_1$ and $P_2$), and move within a guide furrow F formed parallel to the supply pipe 26 to thereby guide and maintain the linear irrigator 10 in the desired path. Typically, if the guide booms 22, 24 stray laterally from the furrow beyond a predetermined limit, the linear irrigator will shut down. It will be appreciated that other guide arrangements, including the use of booms engaged with the water supply pipe, or the use of electronic and/or optical sensors, wire, GPS, etc. may be utilized as well to maintain the linear irrigator on course.

The water supply pipe 26 is fitted with spaced hydrants 28 that supply water to the linear irrigator 10 via the ADS units described below and hose 304 extending from the cart 30 to a distribution pipe running along, on or within the truss assembly 12, and ultimately to the sprinklers (one shown at 13 in FIG. 2) suspended in conventional fashion from the truss assembly, at spaced locations therealong. The supply pipe 26 is shown above ground, but could be underground with only the hydrants 28 exposed It will be understood that the supply pipe 26 is typically laid out consistently with the desired path of the machine. For linear irrigators as described herein, the guide furrow F may be formed alongside and parallel to the pipe 26, while for some traveling sprinklers, the pipe 26 itself will guide and thus define the path of travel. The linear irrigator 10 per se as briefly described above is otherwise generally well known and need not be explained in further detail.

Figure 6:
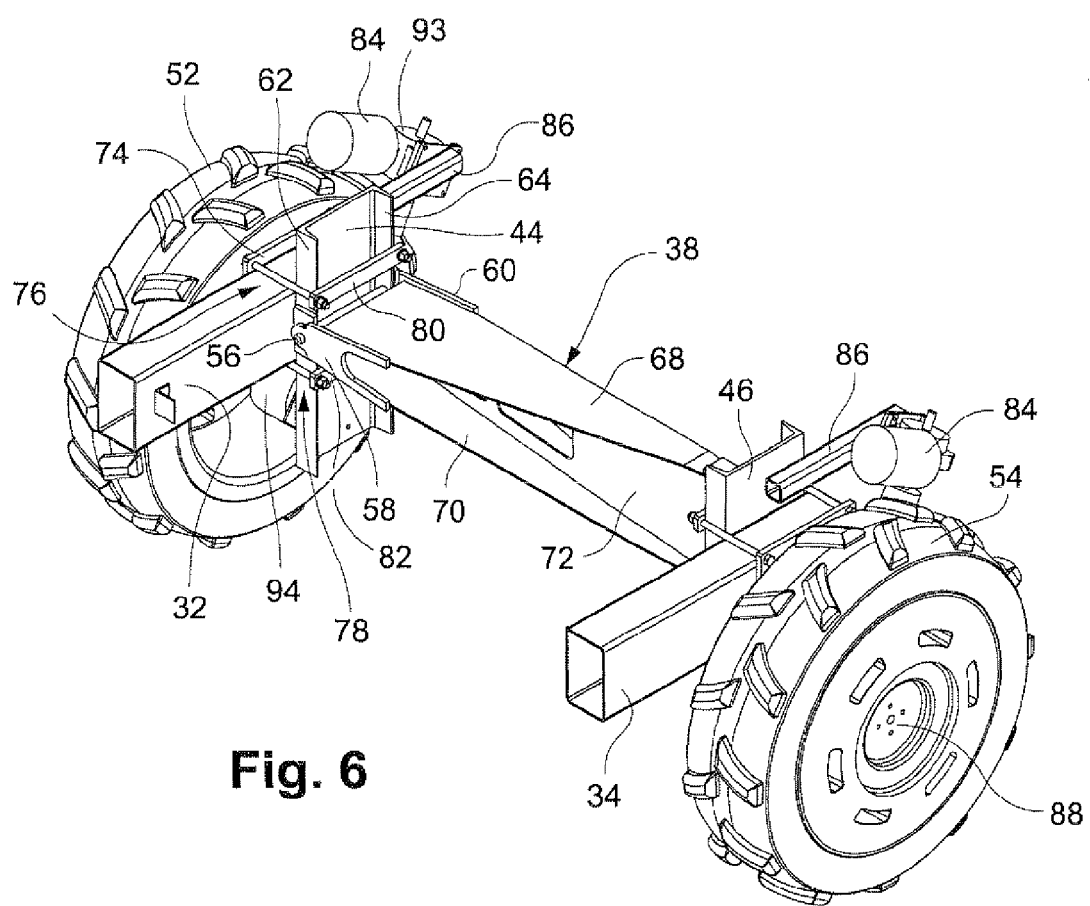
FIG. 6 is a partial perspective view of one end of the cart shown in FIGS. 1 and 2, with parts removed for clarity, illustrating the attachment of a cart end beam to a pair of side beams.
Figure 7:
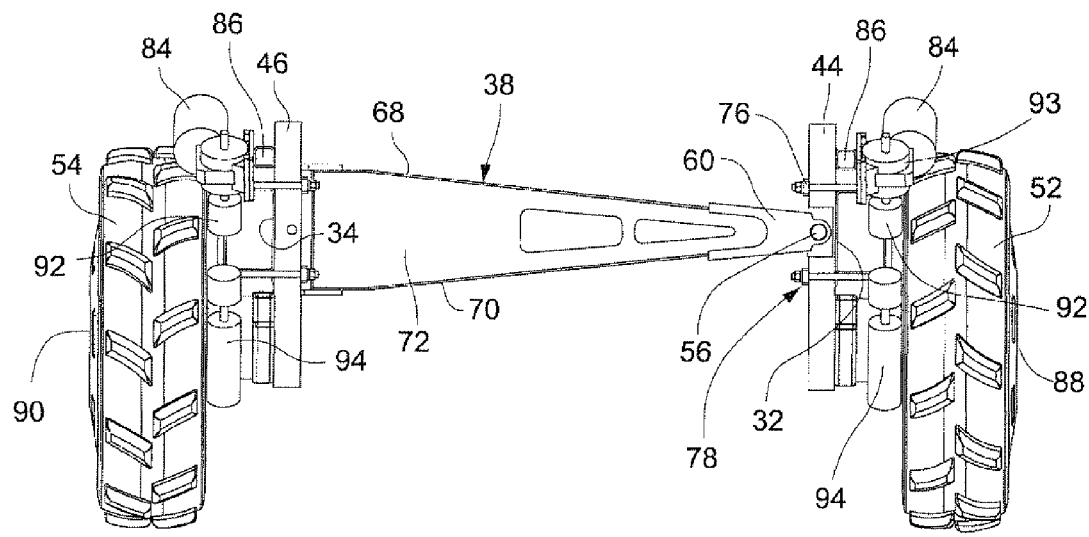
FIG. 7 is a rear elevation of the cart end shown in FIG. 6.
Figure 8:
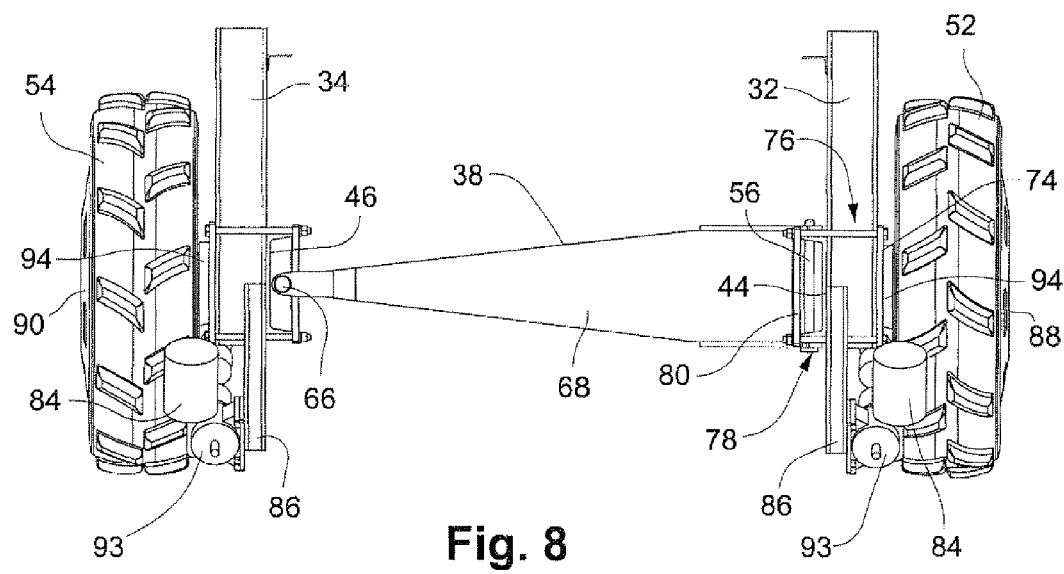
FIG. 8 is a top plan view of the cart end shown in FIG. 6, rotated counterclockwise about 140 degrees.

A tractor or cart 30 in accordance with an exemplary but nonlimiting embodiment has a substantially rectangular support frame (or elongated framework) formed by a pair of parallel side beams 32, 34 and a pair of end beams 36, 38. Relatively short vertical beams 40, 42, 44 and 46 are provided in the corners of the frame where the side and end beams interface. The vertical beams support wheels 48, 50, 52 and 54 and provide attachment points for the end beams 36, 38. Since the side beam/end beam interfaces at both ends of the cart are identical, a description of the arrangement at one end will suffice. As best seen in FIGS. 6-8, one side (the first side) of the end beam 38 is mounted for pivotal movement about a horizontal pivot pin 56 mounted on and across the vertical beam 44, parallel to the side beam 32, via a pair of plates 58, 60, with the pin (or bolt) 56 extending horizontally through the plates 58, 60, through the flanges 62, 64 on the vertical beam 44, and ultimately secured by a nut or other conventional means. The opposite (or second) side of the end beam 38 is mounted for pivotal movement about a vertical pivot pin 66 (FIG. 8) mounted along the vertical beam 46, perpendicular to the side beam 34. To facilitate this arrangement, the end beam 38 is constructed so that the horizontal flanges 68, 70 above and below, respectively, the vertical web member 72 are wide at the horizontal pivot pin 56 and narrow at the vertical pivot pin 66. As best seen in FIG. 6, each vertical beam, for example, beam 44, is held to its respective side beam, in this case, side beam 32, by a plate 74 on the opposite side of the side beam 32, with two pair of tie rods or bolts 76, 78 above and below, straddling the side beam 32 and secured between the plate 74 on one side of the side beam 32, and a pair of cross links 80, 82 on the opposite side of the side beam 32, extending across the vertical beam 44. Additional strength is added to the mounting arrangement by welding the vertical beams to the side beams.

The opposite end beam 36 is similarly mounted, but with the pivot arrangement reversed as best seen in FIG. 1. In other words, the first side of end beam 36 (adjacent side beam 32) is mounted for pivotal movement about a vertical pivot pin on the vertical beam 40 extending perpendicular to the side beam 32, and the second side of the end beam 36 (adjacent side beam 34) is mounted for pivotal movement about a horizontal pivot pin on the vertical beam 42 extending parallel to the side beam 34. This suspension arrangement allows the frame of the cart 30 to flex and accommodate changes in elevation, wheel-to-wheel. More specifically, the oppositely-oriented end beam attachments are designed to permit some flexibility by allowing the end beams to rotate about the two pivot pins that lie perpendicular to each other, while also allowing the two side beams 32, 34 to flex relative to each other as the cart passes over uneven ground, without negatively impacting on the hydrant engagement and disengagement operations described further herein.

Each of the four wheels 48, 50, 52 and 54 may be driven by, for example, a 2 HP (or other suitably rated) electric motor 84 (or an equivalent hydraulic or pneumatic motor) shown supported adjacent each wheel on a suitable bracket member 86 attached to the respective vertical beam (see, for example, the attachment of two of the four motors 84 to beams 44, 46). The motors 84 are connected to wheel hubs or axles (represented at 88, 90) by drive-lines 92, motor gear boxes 93 and wheel gear boxes 94 of otherwise conventional construction. The drive motors 84 are each driven by individually variable frequency drives which are connected to a CAN network (preferably, but not limited to CAN specification 2.0). The CAN network communicates with a main controller 96 (FIG. 1) located in a control panel box 98 supported on the side beam 32. It will be appreciated, of course, that the control panel box 98 could be supported in any convenient location on the cart frame. The main controller 96 also controls the various movements of the cart and its ADS units (as described further herein), and is tied into the controller of the linear irrigator 10 via 120V (or other) communication to ensure coordinated movement of the two machines.

Figure 2:
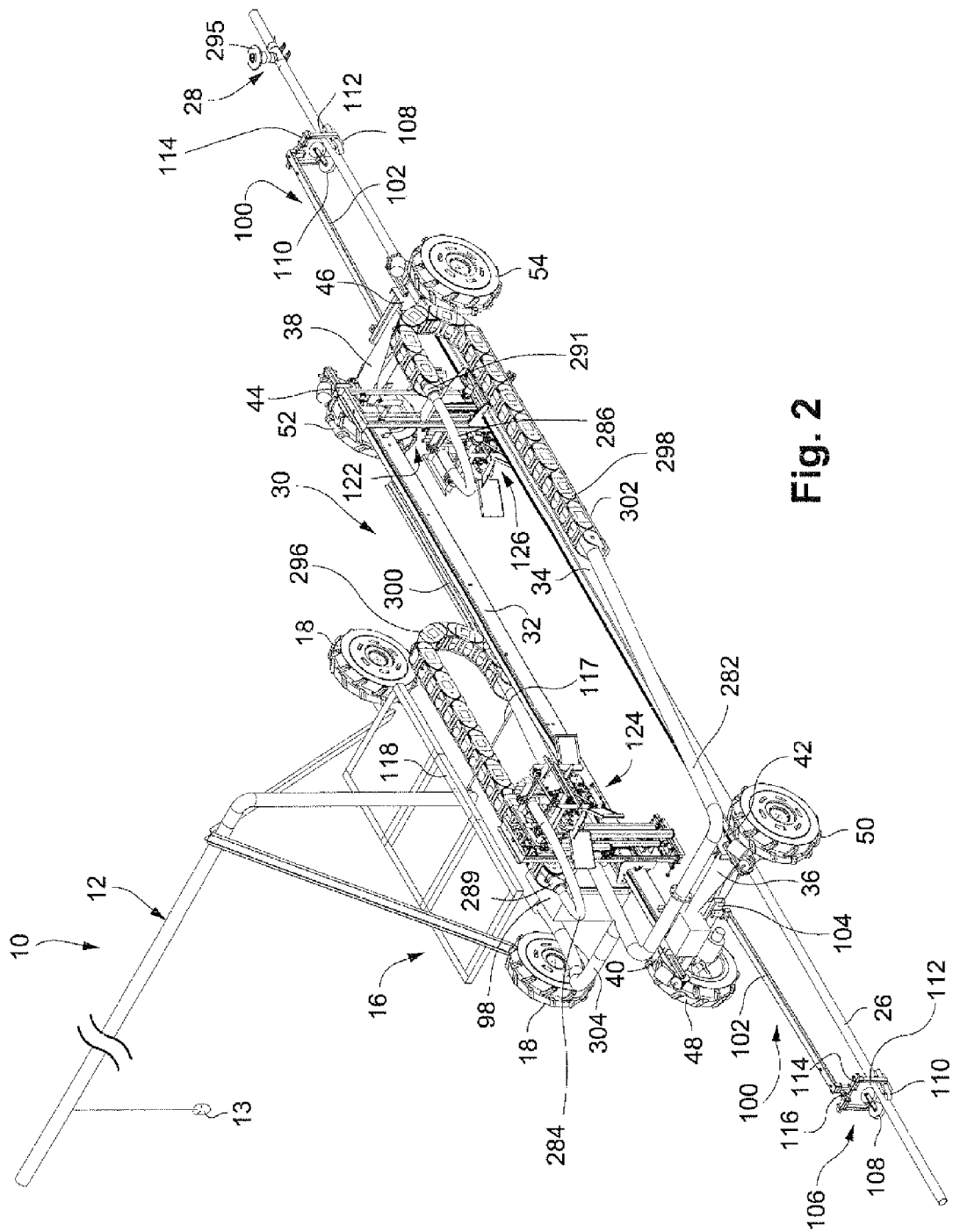
FIG. 2 is a perspective view of the linear irrigator and cart shown in FIG. 1.
Figure 3:
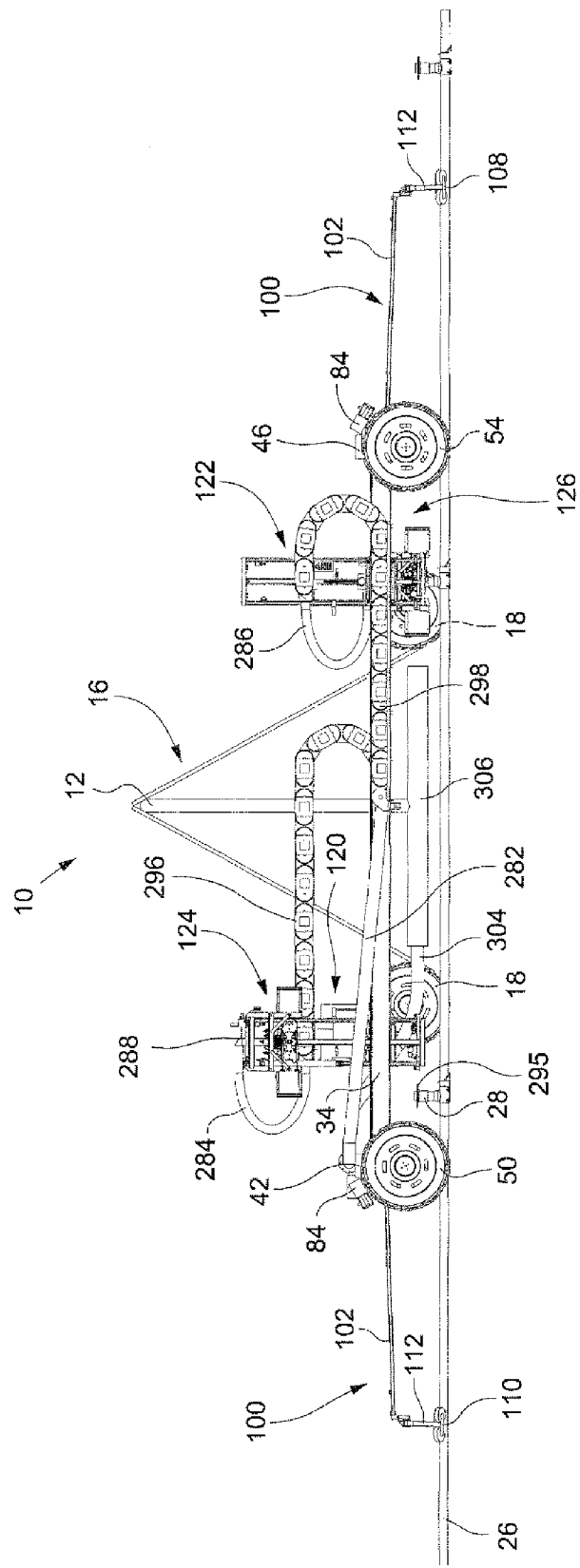
FIG. 3 is a side elevation of the linear irrigator and cart shown in FIGS. 1 and 2.
Figure 4:
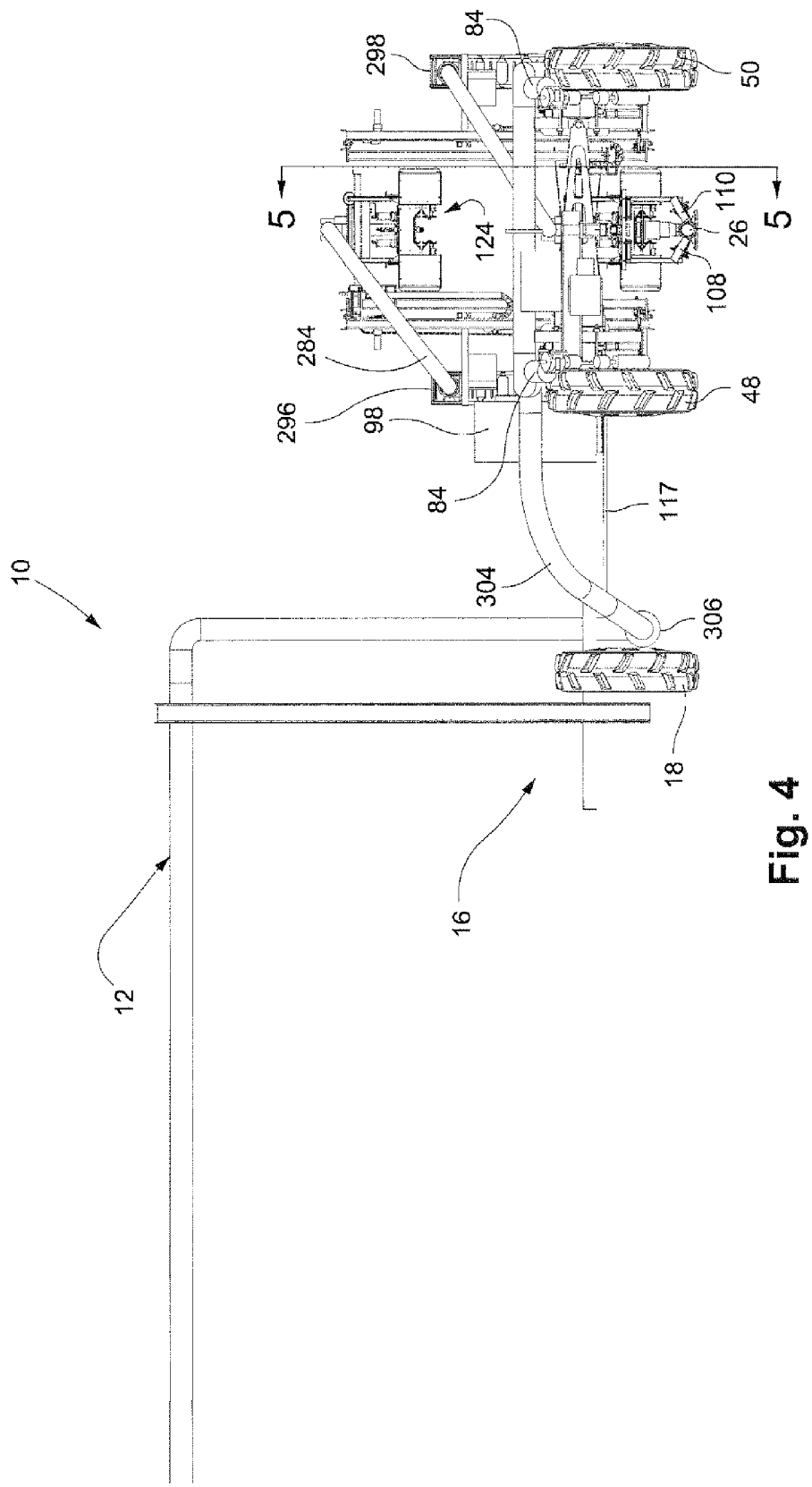
FIG. 4 is a rear elevation of the linear irrigator and cart shown in FIGS. 1 and 2.
Figure 5:
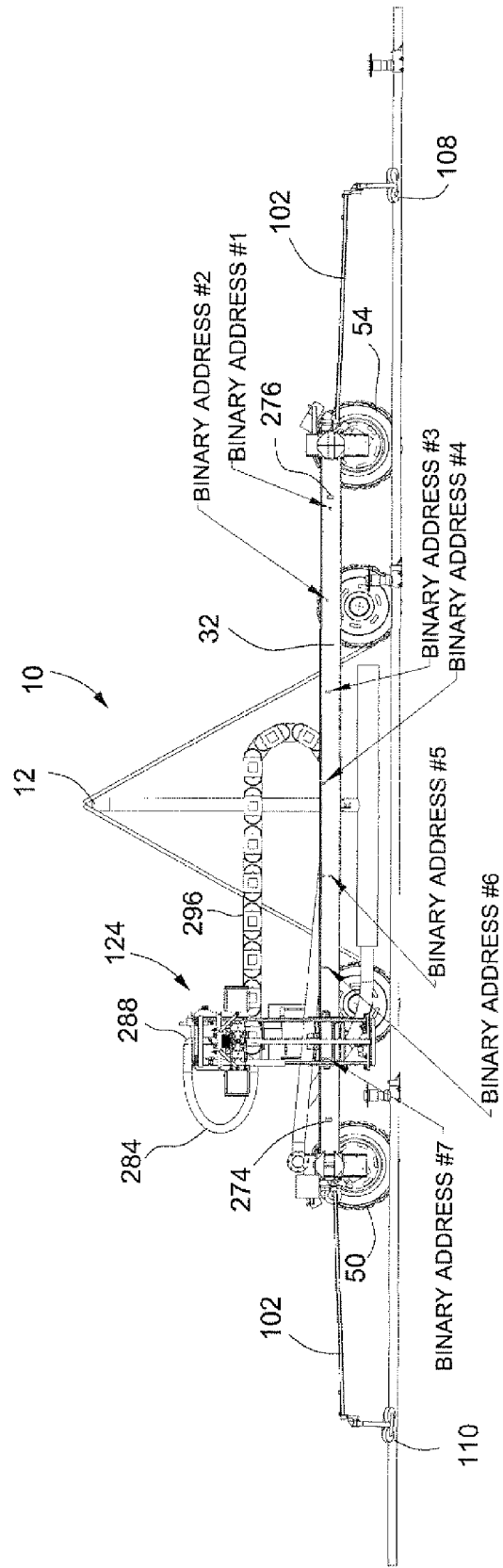
FIG. 5 is a section view taken along the line 5-5 in FIG. 4.

The four wheels 48, 50, 52 and 54 of the cart 30 are not steerable, but the cart 30 is equipped with separate steering mechanisms at the front and rear ends of the cart. The following description assumes a supply pipe configuration where the supply pipe 26 is above ground. With reference especially to FIGS. 2-4, a steering arm assembly 100 includes each steering arm 102 attached at one end to the respective end beams 36, 38 of the cart 30 by means of a universal joint 104 that allows rotation of the arm 102 in horizontal and vertical planes. The opposite end of the steering arm 102 is provided with a pipe follower assembly 106 that includes two pair of follower wheels 108, 110 in constant contact with opposite sides of the pipe 26. Each pair of follower wheels 108, 110 is connected via vertical and horizontal rods 112, 114, respectively, that are in turn connected to the steering arm 102 by a universal joint 116. If the supply pipe 26 is not on (or at least substantially on) the centerline of the cart 30, the steering arm 102 will rotate relative to the cart. An encoder attached to the universal joint 104 measures the resulting angular displacement and signals the controller 96. The cart 30 is then skid-steered to the desired direction by changing the frequency to the individual drive motors 84 according to the encoder output.

The speed of the cart 30 is determined by the speed of the linear irrigator 10. To this end, the cart is provided with a speed control arm 117 (FIGS. 1, 2 and 4) connected at one end to the cart side beam 32 and at its opposite end to a linear irrigator frame component 118 at a location axially between the linear irrigator's drive wheels 18. A speed control encoder is located on the arm 117 and thus the arm 117 provides an angular input to the speed control encoder. This input is then used by the main controller 96 to vary the speed of the cart's drive motors 84 and thereby increase or decrease the speed of the cart, thus ensuring that the cart 30 is always substantially in lateral alignment with the linear irrigator 10. One skilled in the art will appreciate that the cart speed may also be varied by other readily available electric or hydraulic technologies.

Figure 9:
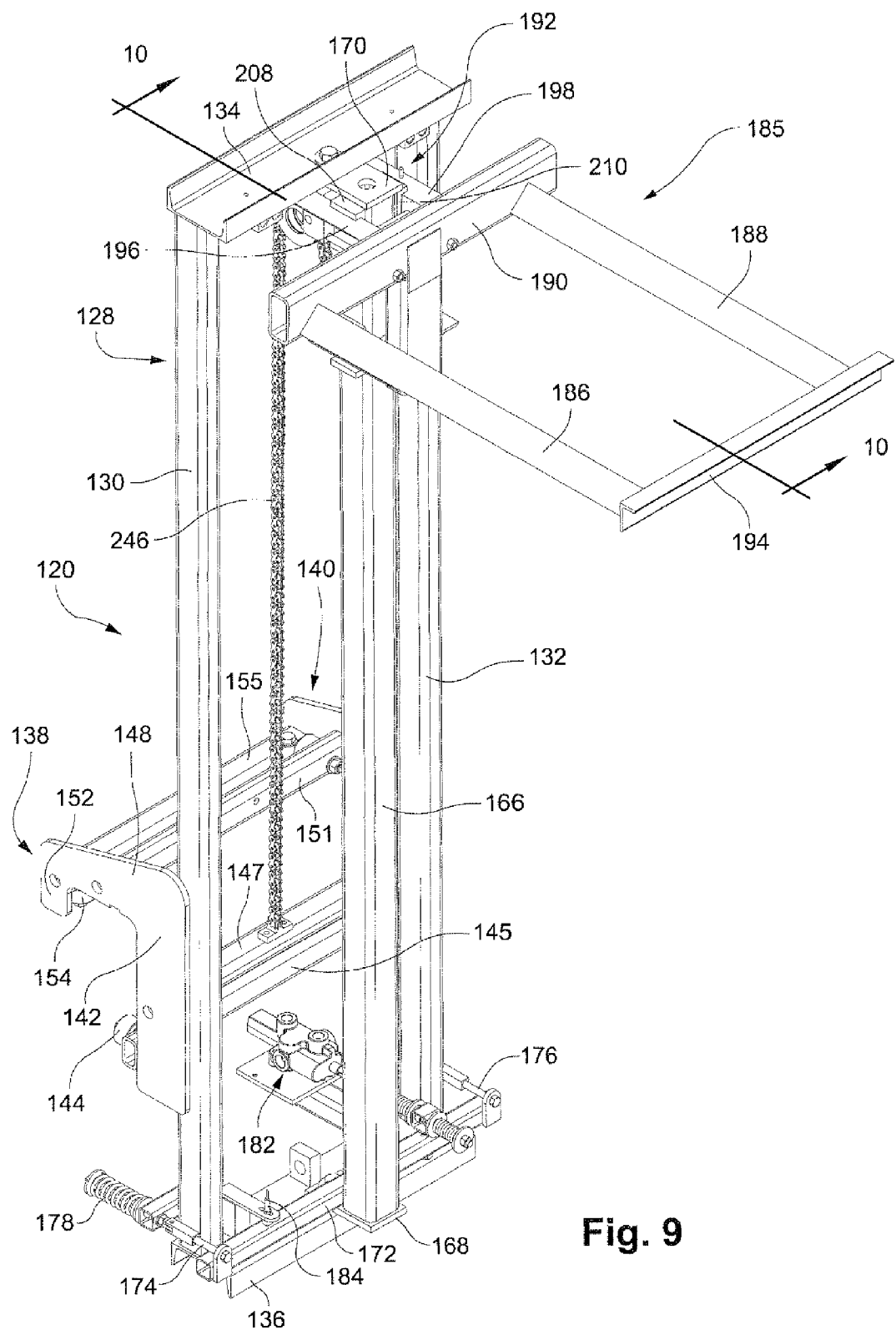
FIG. 9 is a perspective view of a trolley frame removed from the cart shown in FIGS. 1-5, and with the ADS removed.
Figure 10:
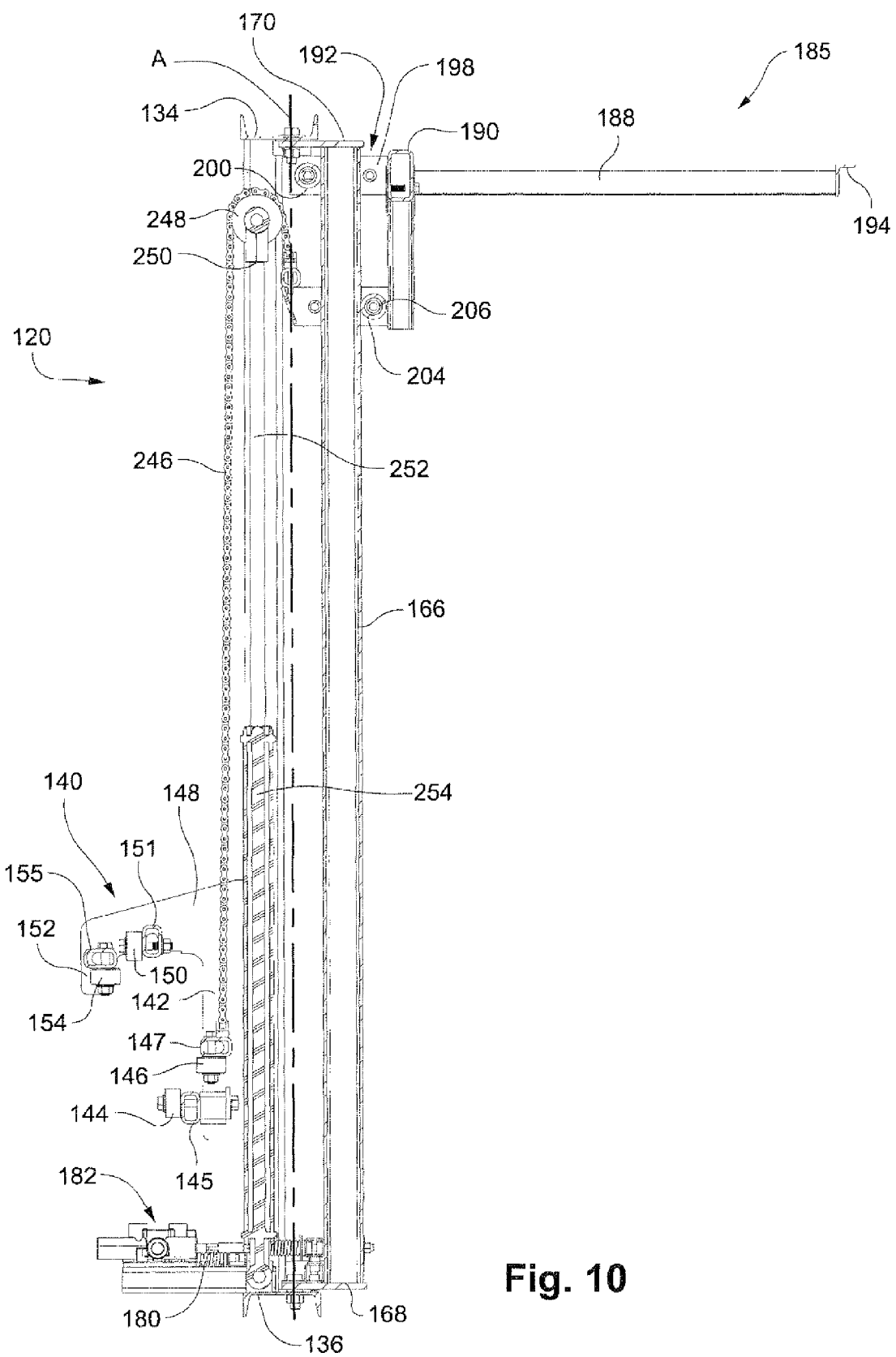
FIG. 10 is a section view taken along the line 10-10 in FIG. 9.
Figure 11:
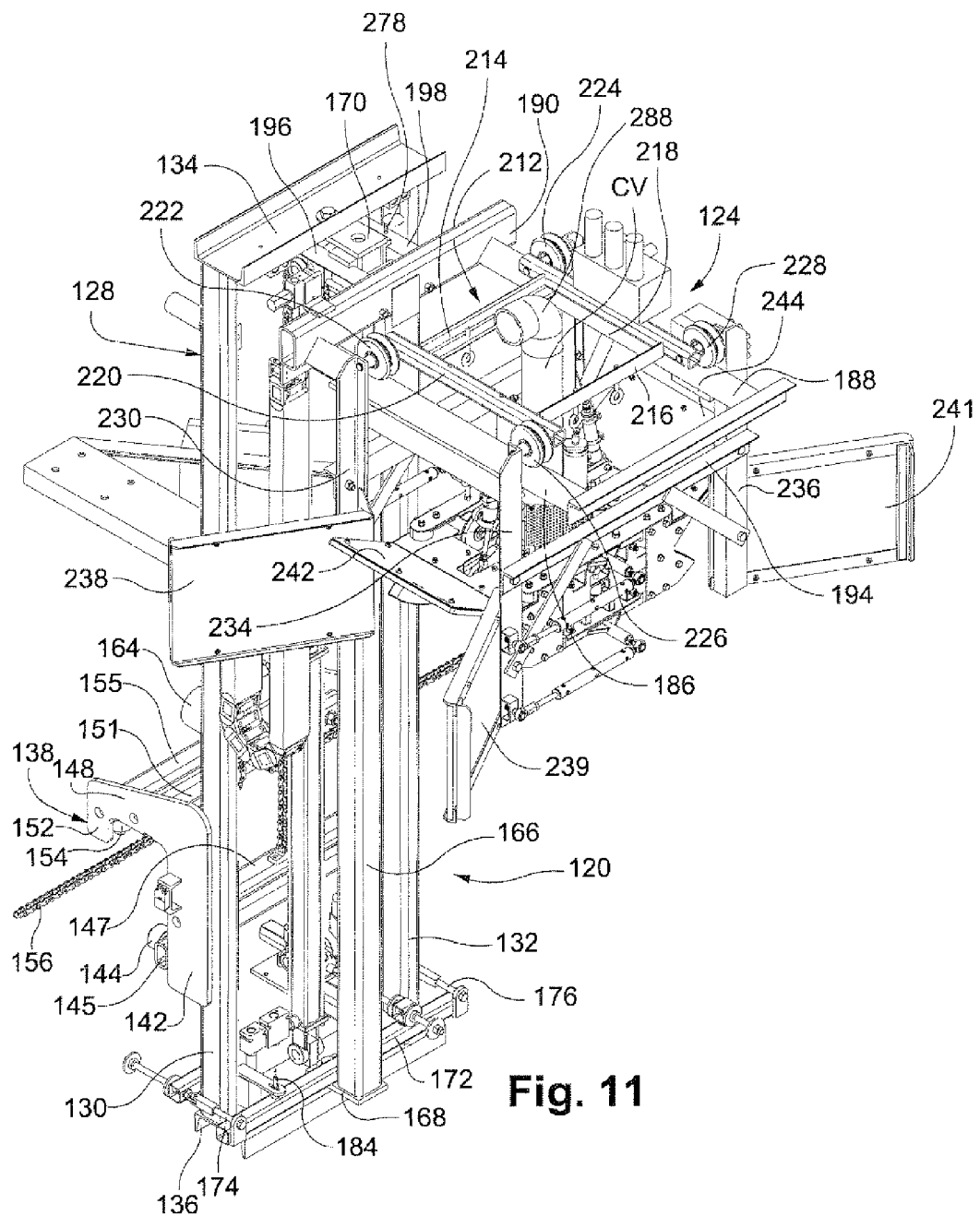
FIG. 11 is a perspective view similar to FIG. 9 but with the ADS added.
Figure 12:
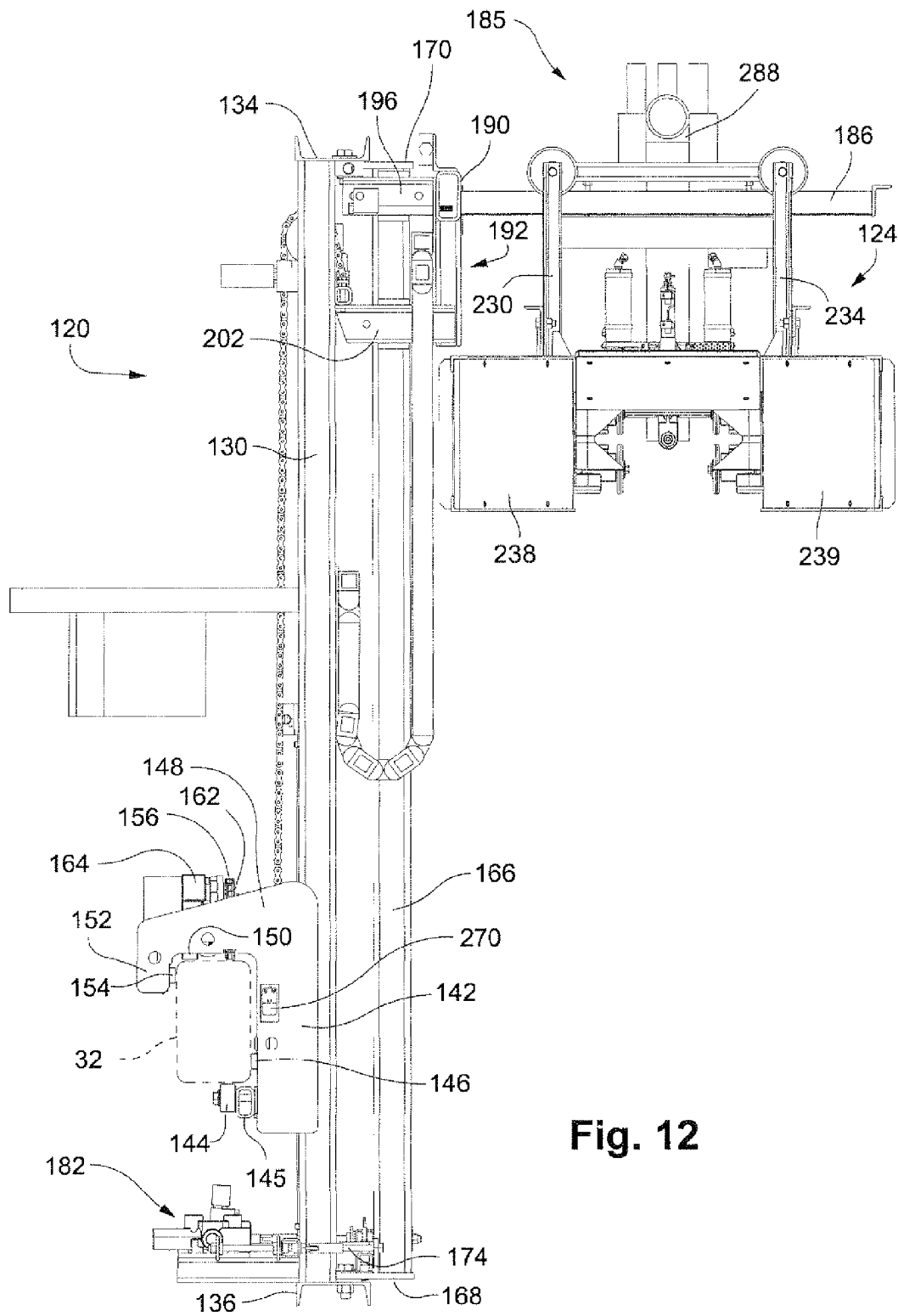
FIG. 12 is a front elevation of the trolley and ADS shown in FIG. 11.
Figure 13:
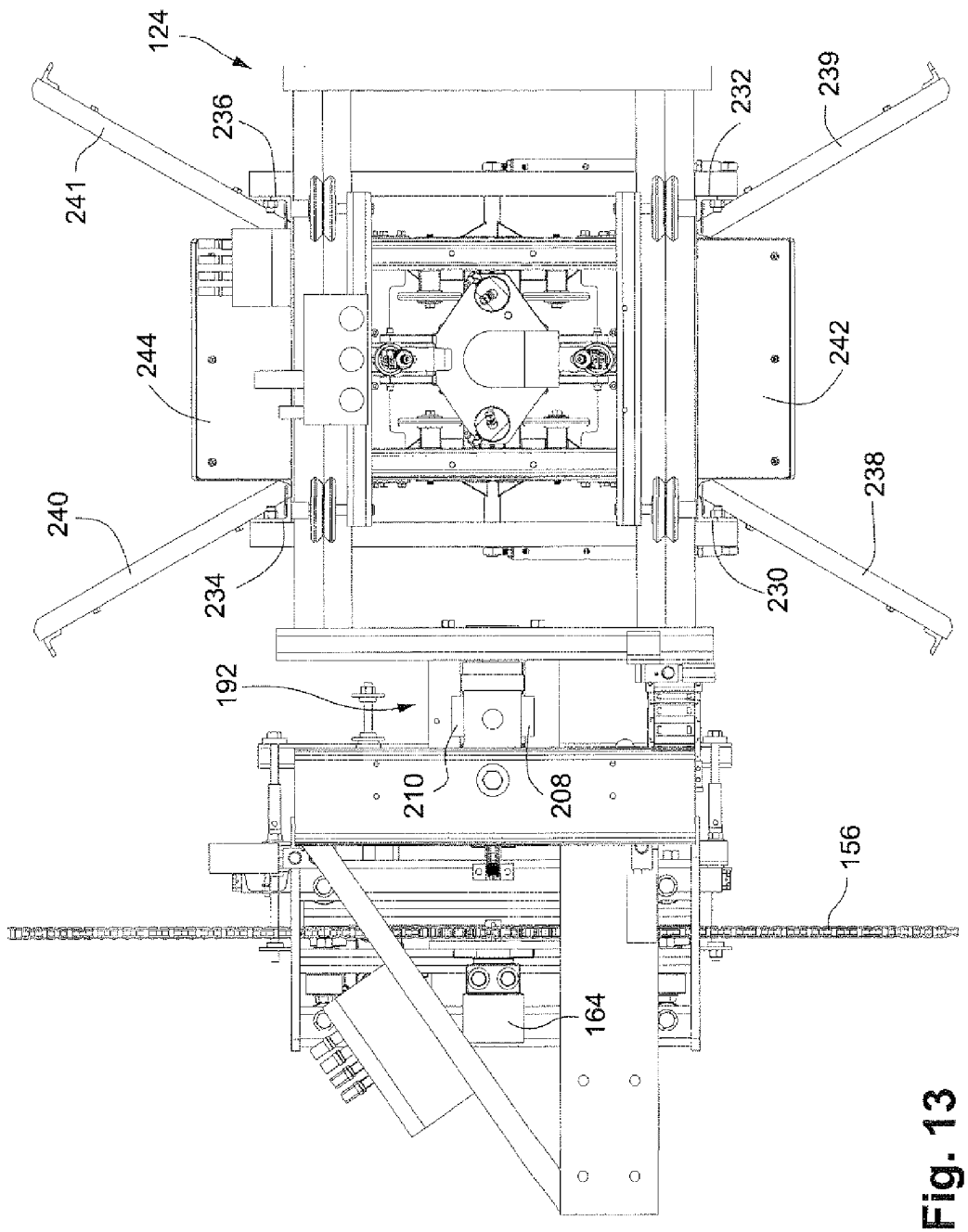
FIG. 13 is a top plan view of the trolley and ADS shown in FIGS. 11 and 12.

The side beams 32, 34 of the cart 30 also serve as guide rails for the pair of trolleys 120, 122 that carry respective ADS units 124, 126. Here again, since the trolleys and the manner in which they carry the ADS units are essentially identical, only one need be described in detail. With reference now especially to FIGS. 9-15, the rearward trolley 120 carries the rearward ADS 124 and permits that unit to be moved linearly along the side beam 32; laterally (or perpendicularly) relative to the side beam 32; and vertically between lowered, intermediate and raised positions. Specifically, as best seen in FIGS. 9 and 10, the trolley 120 comprises an upstanding rectangular frame assembly 128 that includes a pair of vertically-oriented beams 130, 132 connected by an upper cross-beam 134 and a lower cross beam 136. Two inverted, J-shaped roller brackets 138, 140 are fixedly attached to the vertical beams 130, 132, respectively, and extend laterally, inwardly of substantially perpendicular to, the side beam 32 of the cart 30. The roller brackets 138, 140 are substantially identical, and therefore, only one (roller bracket 138) will be described in detail. Note that FIG. 10 shows the roller bracket 140 but with the same reference numerals for identical bracket and roller component. A substantially vertical leg 142 of the roller bracket 138 mounts a first roller 144 for rotation about a horizontal axis and a second roller 146 (best seen in FIG. 10) for rotation about a vertical axis. The substantially horizontal leg 148 of the roller bracket 138 mounts a third roller 150 (also best seen in FIG. 10) for rotation about a horizontal axis, and the downturned lip 152 of the roller bracket 138 mounts a fourth roller 154 for rotation about a vertical axis. These four rollers 144, 146, 150 and 154 are arranged to engage top, bottom and side surfaces of the side beam 32 of the cart when the roller bracket 138 is located and mounted on the side beam 32 as best seen in FIG. 12.

As best seen in FIGS. 9 and 10, the rollers 144 on the spaced roller brackets 138, 140 are secured to the brackets via a first cross-member 145 extending between the brackets 138, 140. Rollers 146 are similarly secured via second cross-member 147. Rollers 150 are similarly secured by a third cross-member 151, and rollers 154 are secured by a fourth cross-member 155 extending between the brackets 138, 140. It will be understood that the pair of roller brackets 138, 140 are welded to the vertically-oriented beams 130, 132 of the trolley frame assembly 128, and support the trolley 120 for rolling movement inside and along the side beam 32 of the cart. The trolley 120 and its respective ADS 124 are moved along the side beam 32 by means of a drive chain 156 (FIGS. 11, 13, 14 and 15) connected at opposite ends of the side beam 32. At the trolley frame assembly 128, the drive chain 156 engages a pair of axially aligned idler sprockets 158, 160 on either side of an elevated drive sprocket 162 (FIG. 15) fixed to the output shaft of a hydraulic trolley motor 164. Depending on the direction of rotation of the motor output shaft (and hence drive sprocket 162), the trolley 120 and its ADS 124 will move axially along the side beam 32 between the forward and rearward ends of the cart 30.

Secured midway between the vertically-oriented beams 130, 132 of the trolley 120 is a vertical guide post 166 (FIGS. 9-12). The guide post 166 is located laterally inwardly of the vertically-oriented beams 130, 132 (i.e., towards the centerline of the cart frame), secured at its lower end to the cross-beam 136 via a connector plate or tab 168, and at its upper end to the cross-beam 134 via a second connector plate or tab 170. Bolts connecting the lower and upper tabs 168 and 170 (each provided with a bushing through which the bolts pass) to the cross beams 136, 134 establish a vertical pivot axis A (see FIG. 10) about which the guide post 166 can rotate. The cross-beams 134 and 136 are, in turn, welded or otherwise secured to the vertically-oriented beams 130, 132.

A centering mechanism is used to keep the guide post 166, (and hence the ADS 124), from rotating in the absence of an external load. With reference especially to FIGS. 9-12, a sensing rod 172 is attached at the lower end of the guide post 166 and extends in a direction parallel to the lower cross beam 136. Thus, the sensing rod 172 rotates with the guide post. Push rods 174 and 176 at opposite ends of the sensing rod 172, extend perpendicularly to the sensing rod 172 and move in concert with the sensing rod. Resistance to the rotation of the guide post 166 (and sensing rod 172) is provided by centering springs 178, 180 (FIGS. 9, 10) that act against the push rods 174, 176, respectively.

When an ADS is engaged with a hydrant 28, the ADS and its respective trolley (e.g., ADS 124 and trolley 120) need to move in the opposite direction as the cart moves forward. In order to accomplish this, a spool valve 182 is used in concert with the centering mechanism to port hydraulic fluid to the trolley hydraulic motor 164. As the cart 30 moves forward during this relative movement, an external load is applied to the centering mechanism via sensing rod 172. Once the load overcomes the respective centering spring 178 or 180, the vertical guide post will rotate. The vertical guide post 166 is mechanically connected to the spool component of the spool valve 182, and therefore, rotation of the guide post 166 either pushes or pulls (depending on direction) the spool component which, in turn, ports hydraulic fluid to the trolley hydraulic motor 164. The hydraulic motor 164 will then drive the trolley 120 in the opposite direction of cart movement. An over-travel sensor 184 is used to detect if the sensing rod 172 and vertical guide post 166 have rotated beyond predetermined limits. Here again, one skilled in the art could accomplish the same functionality using other existing technologies such as electronic logic or proportional fluid modulation.

As best seen in FIGS. 9 and 10, the trolley frame assembly 128 also includes an ADS support frame assembly 185 formed by a pair of parallel transverse rails 186, 188 that extend perpendicular to the side beam 32, in a direction toward the centerline of the cart 30. The transverse rails 186, 188 may comprise rigid, inverted V-shaped angles fixed at one end by welding or other suitable means to a frame member 190 that extends parallel to the side beam 32. The frame member 190, in turn, supports (again, via welding or other suitable means) a box-like bracket assembly 192 (FIGS. 10-13) engaged with opposite sides of the guide post 166. The opposite ends of the rails 186, 188 are connected by an angle rod 194. The bracket assembly 192 includes a pair of upper bracket components 196, 198 mounting an upper roller 200 (FIG. 10) that engages the outside of the guide post 166 (that side furthest from the cart centerline), and a pair of lower bracket components 202, 204 mounting a lower roller 206 that engages the inside of the guide post 166. Vertically-oriented side guides 208, 210 are fixed to the surfaces of the guide post 166 perpendicular to the surfaces engaged by the rollers, and engaged with the upper and lower bracket components 196, 198 and 202, 204. The rollers and side guides ensure smooth up and down movement of the ADS support frame assembly 185 (and hence the ADS 124) on the guide post 166.

The ADS 124 is supported on the transverse trolley rails 186, 188 by a hanger assembly 212 (FIGS. 11, 12, 13) that includes a pair of axially-oriented docker support angles 214, 216 connected by laterally extending tubes 218, 220, thus forming a generally square frame. At the four corners of the frame are rollers 222, 224, and 226, 228 arranged to ride on the respective transverse rails 186, 188. Vertical rods 230, 232, 234 and 236, respectively, extend downwardly from the four corners of the frame, and mount two pair of vertically-oriented guide wings 238, 239 and 240, 241. The rearward pair of guide wings 238, 239 extends rearwardly of the ADS 124, flaring outwardly in the rearward direction. The second or forward pair of guide wings 240, 241 extends forwardly, flaring outwardly in the forward direction such that in plan, the two pair of guide wings present an X-shape, with the ADS 124 at the center of the X. The guide wing pairs 238, 239, 240 and 241 enable lateral adjustment of the ADS 124 upon engagement with a hydrant flange that is laterally misaligned with respect to the ADS. Additional generally horizontally-oriented (but upwardly slanted) guide wings 242, 244 extending rearwardly and forwardly, respectively, from the hanger assembly 212 similarly enable relatively minor vertical adjustments of the ADS 124 upon engagement with a vertically misaligned hydrant.

Figure 16A:
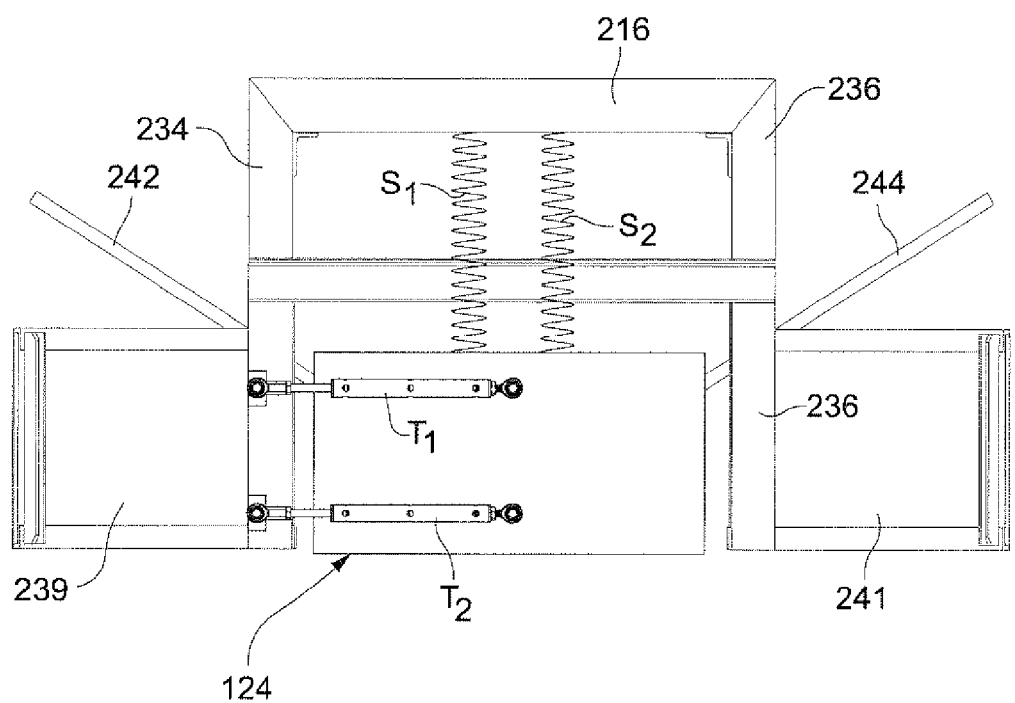
FIGS. 16A and B are simplified schematic illustrations of the manner in which the ADS is suspended from the trolley.
Figure 16B:
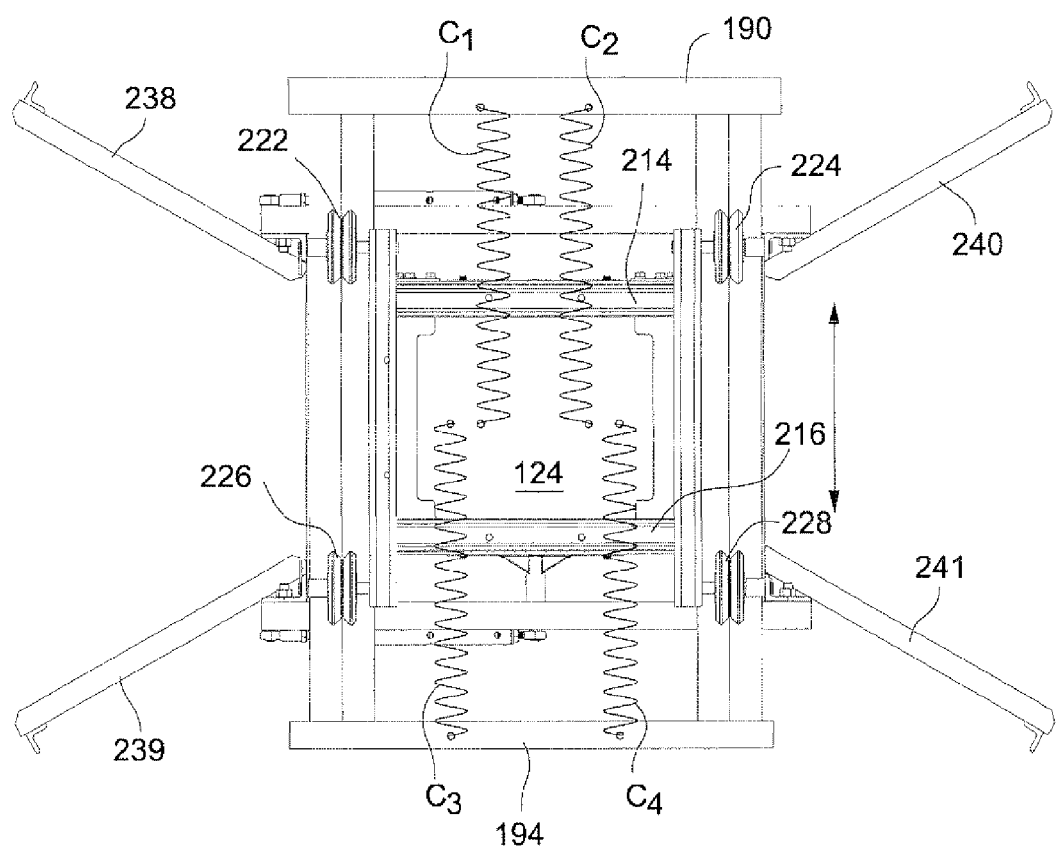

The ADS 124 itself is suspended from the docker support angles 214, 216 substantially as described in the '004 and '563 patents, for substantially free-floating movement (movement about at least three mutually perpendicular axes, thus enabling up, down, forward, backward, side-to-side as well as tilting and twisting motions) relative to the trolley for enabling "soft" engagement and docking with misaligned hydrants. Briefly, and with reference to the schematic illustrations in FIGS. 16A and 16B, a set of four vertically-oriented coil springs (two shown at $S_1$, $S_2$) are used to suspend the ADS 124 from the hanger assembly 212, while a pair of compressible tie rods $T_1$, $T_2$ extend between the ADS 124 and the vertically-oriented rods 234, 230 on each side of the ADS, using swivel or universal bushings at the connection points. The springs and tie rods together permit side-to-side, front-to-back, and compound movements (including twisting and tilting) of the ADS relative to the respective trolley and to the cart. In addition, plural, horizontally-oriented coil springs $C_1$, $C_2$, $C_3$, and $C_4$ (FIG. 16B) extend between the frame members 190 and the ADS 124, and between angle rod 194 and the ADS 124. These springs are used to maintain the ADS in a generally centered position on the trolley rods 186, 188. (FIG. 16B. Reference is made to the '004 and '563 patents and the publication for additional details.

If necessary, more extreme vertical and horizontal adjustments to the ADS units 124, 126 may be made with the assistance of power-assist devices such as for example, piston and cylinder assemblies. For example, for addressing more extreme lateral alignment possibilities, movement of the ADS units 124, 126 along the trolley rails 186, 188 may be facilitated by the use of one or more hydraulic actuators, controlled by sensors, that would move the ADS units to the right or left along the rails 186, 188. Extreme vertical adjustments may be made by the hydraulic actuator 254.

As mentioned above, the box-like bracket assembly 192 (and hence ADS 124 via hanger assembly 212) is arranged to slide up and down on the vertical guide post 166. As best seen in FIGS. 9-11, the vertical movement of ADS 124 on the guide post 166 is implemented by a lifting chain 246 extending between a first fixed location on the cross member 147 extending between the inverted J-shaped roller brackets 138, 140 and the box-like bracket assembly 192, passing over a pulley 248 rotatably fixed on the remote end 250 of a piston rod 252 of the hydraulic actuator 254. The hydraulic actuator 254 is secured to the cross beam 136 and extends vertically upwardly, parallel to and adjacent the guide post 166. When the piston rod 252 is in a retracted position, the ADS 124 is in a lowered or "down" position, at approximately the desired docking height for engaging a hydrant 28. Extension of the piston rod 252 to the position shown in FIGS. 3-5 and 9-12 results in raising the ADS 124 to an "up" position. This arrangement enables the ADS 124 not only to be adjusted relative to a more severely vertically misaligned hydrant 28 to be engaged, but also to be raised to a height sufficient to allow e.g., ADS 124, to pass over, or leapfrog, the top of ADS 126 when the latter is engaged with a hydrant 28 (or vice versa). Sensors described further below) are used to detect the vertical positions of the ADS units on the respective guide posts 166.

In order to properly coordinate both the linear and vertical movements of the left and right trolleys 120, 122 and their respective ADS units 124, 126, the cart's main controller 96 must know the location of each trolley 120, 122 relative to the respective side beams 32, 34. Accordingly, and with reference especially to FIGS. 5, 14 and 15 a series of binary address tabs are attached to the left and right side beams 32, 34 of the cart 30, on the surfaces of the beams facing inward (indicated as binary address numbers one through seven in FIG. 5). Each trolley has three vertically-arranged proximity switches 264, 266 and 268 that read the combination of tabs on the respective side beams. In binary fashion, the top switch 264 represents a value of 4; the middle switch 266 represents a value of 2; and the lower proximity switch represents a value of 1. By adding up the values of each tab sensed, a transition point address is determined. For example, if only the middle and top switches 264 and 266 are present, then the top and middle proximity switches would turn on, while the bottom proximity switch 268 remains off. The sum of the top and middle switches in the "on" state is 6. This corresponds to a transition point or binary address 6 which the controller 96 will use along with the direction of travel to establish either a zone of trolley location, or a discrete location (only the zone configuration is shown). In other words, when passing transition point 6 in a forward direction, the trolley is determined to be in zone 6. When passing transition point 6 in the reverse direction, the trolley enters zone 5. Each zone is approximately 47 inches in length. The main controller 96 is also able to determine the position of the linear irrigator 10 relative to a given field within that same 47-inch range. This is done using the trolley zone information described above. Specifically, the linear irrigator 10 and cart 30 are kept aligned with each other via the encoder and speed control arm 117 described above. Since the encoder is fixed at the centerline of the cart, the controller 96 can determine the position of the trolley 120 or 122 relative to the encoder and hence relative to the linear irrigator. The controller 96 counts the hydrant valve locations as the mechanism moves through the field during operation. Since the distance between valves is known and established (for example, 20 ft.), the main controller 96 can determine the distance (and therefore location) the linear irrigator 10 has traversed from the first hydrant valve 28.

Figure 14:
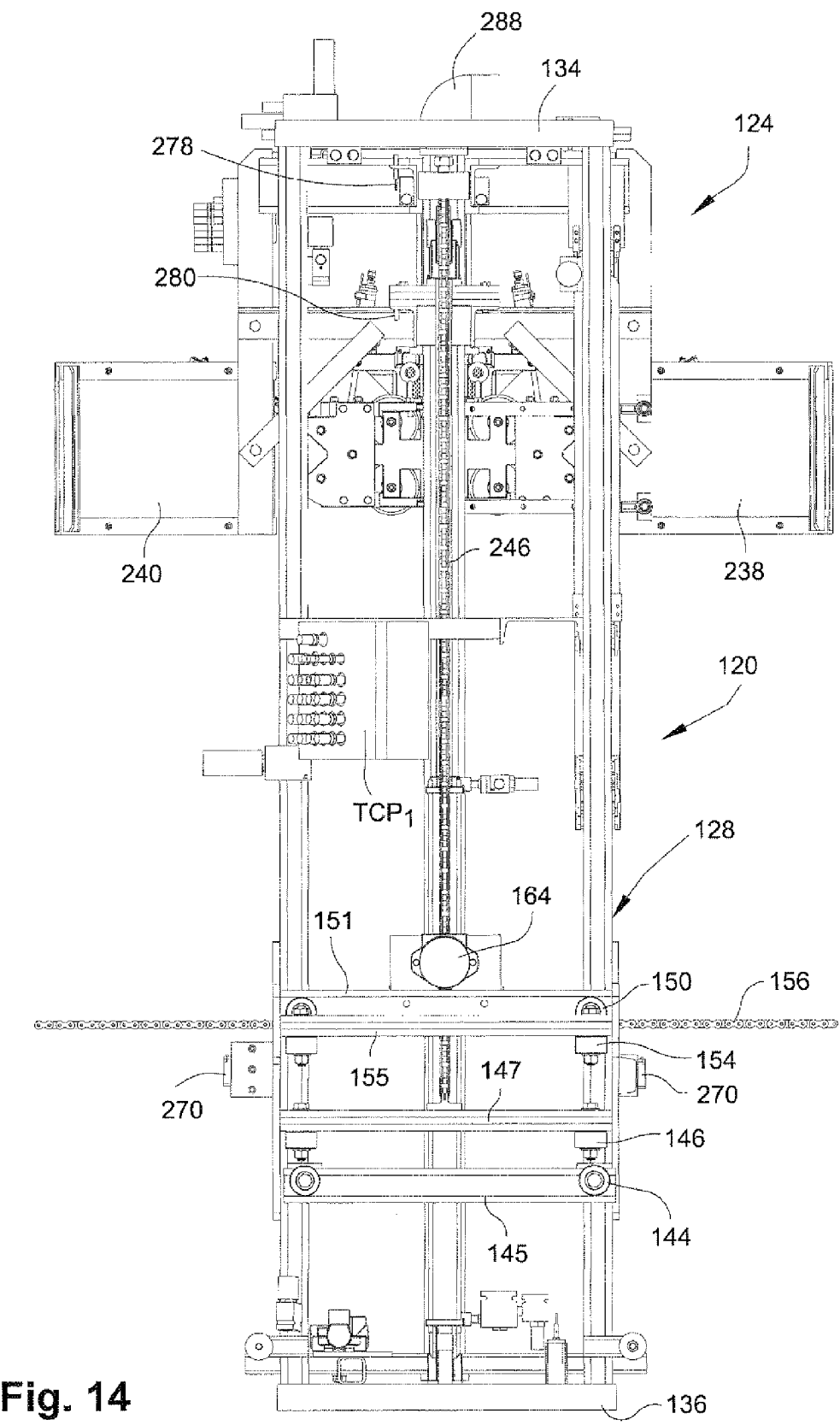
FIG. 14 is a right side view of the trolley and ADS shown in FIGS. 11-13.
Figure 15:
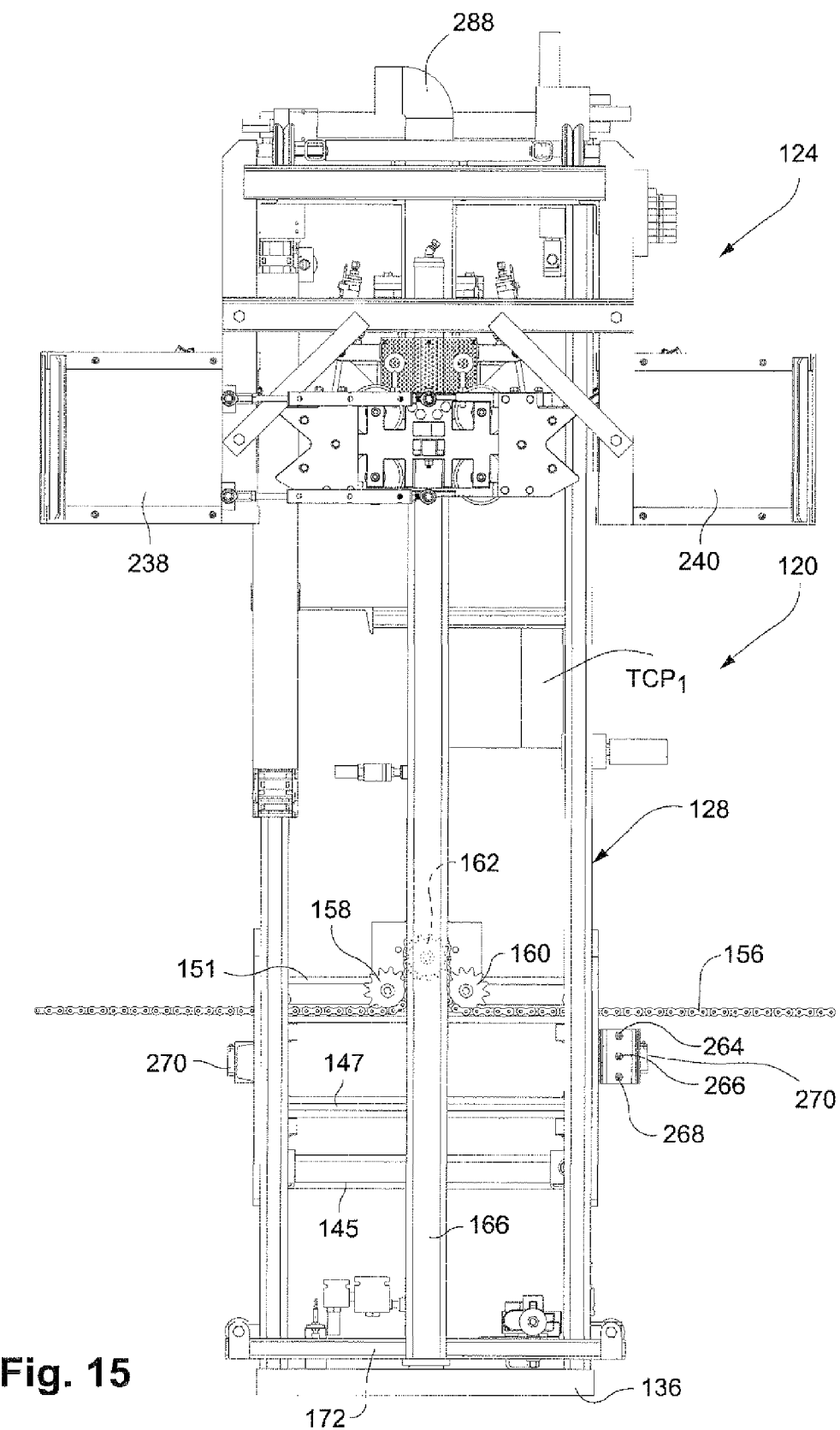
FIG. 15 is a left side view of the trolley and ADS shown in FIGS. 11-13.

In addition to the sensors and switches used to control the linear location of the trolleys relative to the cart side beams, and the cart relative to the linear irrigator, the following sensors and switches are employed to control other aspects of the movement of the trolleys and/or ADS units:

(a) forward and reverse trolley over-travel sensors 270—one located on each of the J-shaped roller brackets 138, 140 of each trolley (one pair shown in FIGS. 12, 14 and 15);

(b) forward and rearward trolley over-travel stops 274, 276 located at forward and rearward ends of each of the cart side beams 32, 34 and used in combination with the over-travel proximity sensors 270 (one pair shown in FIG. 5) to shut the ADS down in the event of failure of the binary address/trolley vertical proximity switch arrangement;

(c) a trolley-up sensor 278—fixed to the supporting angle 214 (on each trolley) and used to indicate that the respective ADS is in the "up" position;

(d) a trolley-down sensor 280—fixed to the lower bracket component 204 (on each trolley) and used to indicate that the ADS is on the "down" position.

In addition to the above, a number of sensors are provided on each ADS unit to control the location, actuation and de-activation of the hydrant valve by the valve actuator on the ADS, as explained in the '004 and '563 patents.

The various sensors are associated with specific control panels including left and right trolley control panels (see for example, $TCP_1$ in FIGS. 14 and 15) that control horizontal and vertical movements of the trolleys and ADS movements relative to the hydrants during docking including hydrant valve opening and closing; and front and rear steering arms. The various panels and modules communicate with the main controller 96 in the control panel 98.

Another feature of the exemplary embodiment described herein relates to hose management. As already explained the linear irrigator 10 is supplied with water by the ADS units 124, 126. In order to accommodate the back and forth as well as up and down movements of the ADS units, it is necessary to provide controlled movement of the hoses that are attached between the ADS units 124, 126 and a substantially rigid U-shaped manifold 282 that is supported on the cart and that supplies water to the Linear irrigator. In the exemplary embodiment, flexible first connector hoses 284, 286 (e.g., 4-inch dia.) connect to the respective ADS units 124, 126 via vertically-oriented swivel joints 288, 290 on the respective ADS units. The opposite ends of the connector hoses 284, 286 are attached to flexible second connector hoses 292, 294 (e.g. 6-inch dia.) via horizontally-oriented swivel joints 289, 291, respectively. The ADS connector hose swivel joints swivel in a horizontal plane while the ADS swivel joints swivel in a vertical plane. This allows the ADS units 124, 126 to be raised and lowered vertically without any undue loads on the connector hoses. Second horizontal swivel joints (one shown at 293 in FIG. 21) may be added to the first connector hoses 284, 286, respectively to prevent the ADS units 124 and 126 from twisting during vertical movements of the ADS units on their respective trolleys 120, 122.

Figure 21:
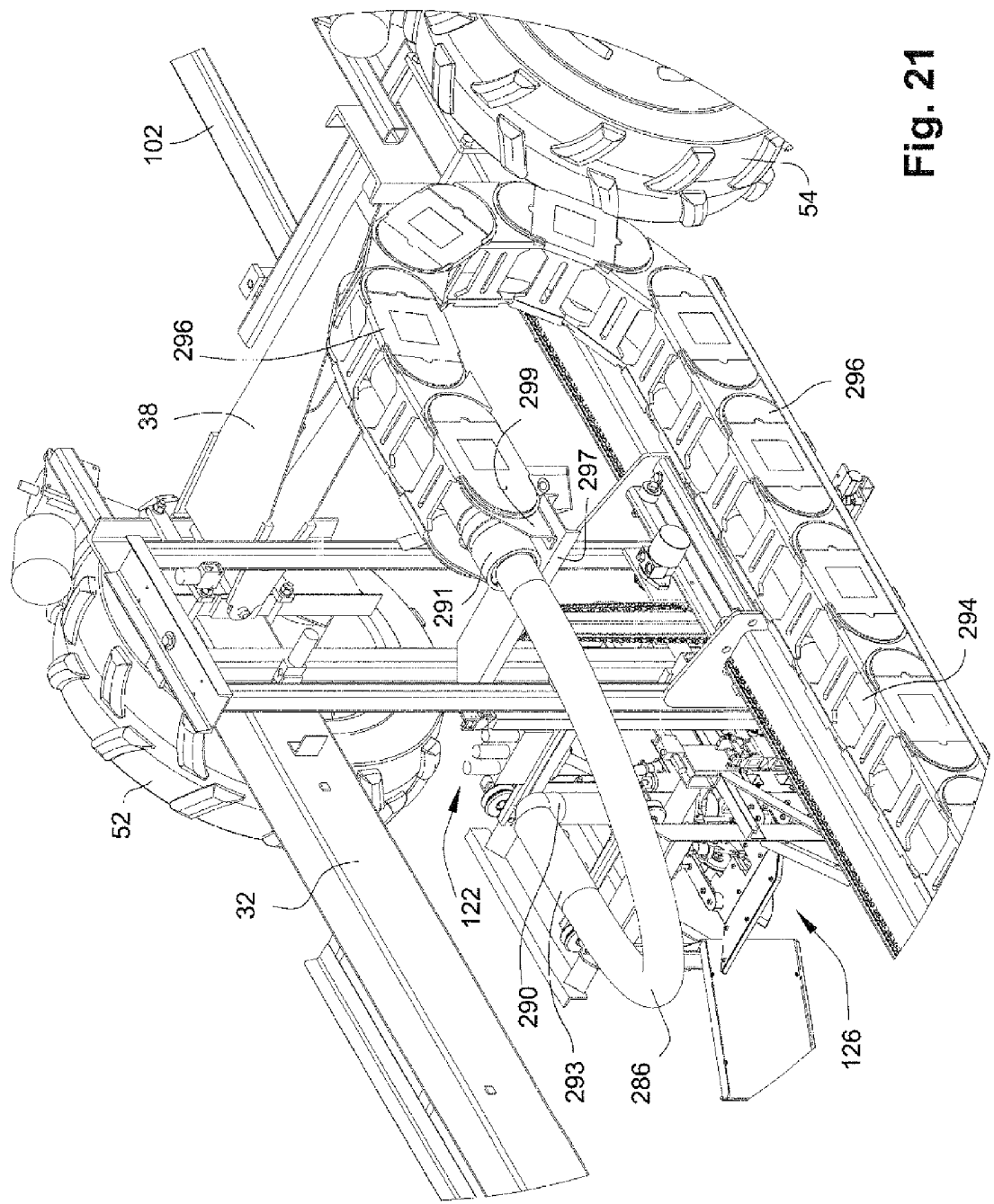
FIG. 21 is a partial enlarged perspective taken from FIG. 2.

The second connector hoses 292, 294 pass through flexible guide chains 296, 298 and attach to the free ends of the substantially U-shaped, rigid manifold 282. The protective, flexible guide chains 296, 298 can roll and unroll while being self-supporting. They serve to guide and support the flexible second connector hoses 292, 294 as the trolleys 120, 122 move back and forth on the cart side beams 32, 34, and as the ADS units 124, 126 are raised and lowered on the trolleys 120, 122. The flexible guide chains 296, 298 sit on and within flanged guide trays 300, 302 that are rigidly attached to the cart side beams 32, 34, respectively. The flexible guide chains themselves are hard-mounted to their respective trolleys and to the free ends of the rigid manifold 282. For example, FIG. 21 shows in more detail the connection of the guide chain 296 to a plate 297 fixed to the trolley 122 via a bracket 299. Guide chain 298 is secured to trolley 120 in a similar fashion. The substantially rigid manifold 282 is attached to the cart frame by any suitable means and connects both of the ADS units 124, 126 to the linear irrigator 10 via a main feeder hose 304 connected at one end to the manifold 282 and its opposite end to the linear irrigator manifold 306. One flexible guide chain especially suited for use with this invention is a cable carrier available from igus, Inc. of East Providence, R.I. under the trade name Energy Chain®, but other suitable protective devices may be available as well. The respective hoses and guide chains simply roll back and forth along respective trays 300, 302 secured alongside the side beams 32, 34 as evident from FIGS. 1, 2 and 17-19, accommodating both horizontal and vertical movements of the ADS units 124, 126, and controlling the rolling bend radii so as to prevent kinking or lateral straying of the hoses. Similar guide chains of selected size may be used to enclose and control movement of the various hydraulic and electrical lines used on the cart.

An exemplary but nonlimiting method of operating the cart will now be described in connection with FIGS. 2 and 17-20. The linear irrigator 10 is set up initially to run along the linear path P1 (FIG. 1), typically running alongside a rectilinear field, with the water supply pipe 26 located above or below ground, also running alongside the linear irrigator. As noted above, the linear irrigator drive and steering systems as well as the truss assembly, water feed manifold and sprinklers may be of conventional design, except as otherwise noted.

As already explained, the supply pipe 26 is fitted with a plurality of hydrants 28 spaced along the pipe, each hydrant 28 incorporating an actuation valve accessible from above the valve. While the hydrant and hydrant valve may be considered of conventional design, the hydrant housing is modified (or redesigned) to include a horizontally oriented annular flange 295 that is used to facilitate engagement by the ADS units. The cart 30 is located alongside the end tower 16 of the linear irrigator, straddling the supply pipe 26.

For purposes of this description, it will be understood that while the cart 30 moves substantially in concert with the linear irrigator 10, at substantially the same speed, there may be short dwell times on the part of both the linear irrigator and the cart, and these dwell times are not necessarily simultaneous. Further in this regard, however, the speed control mechanism described above allows the cart to "speed up" or "slow down" as needed to maintain its position relative to the linear irrigator. Accordingly, the description below is focused on the movements of the cart 30 and the manner in which successive hydrants 28 are engaged and disengaged by the pair of ADS units 124, 126.

Figure 17:
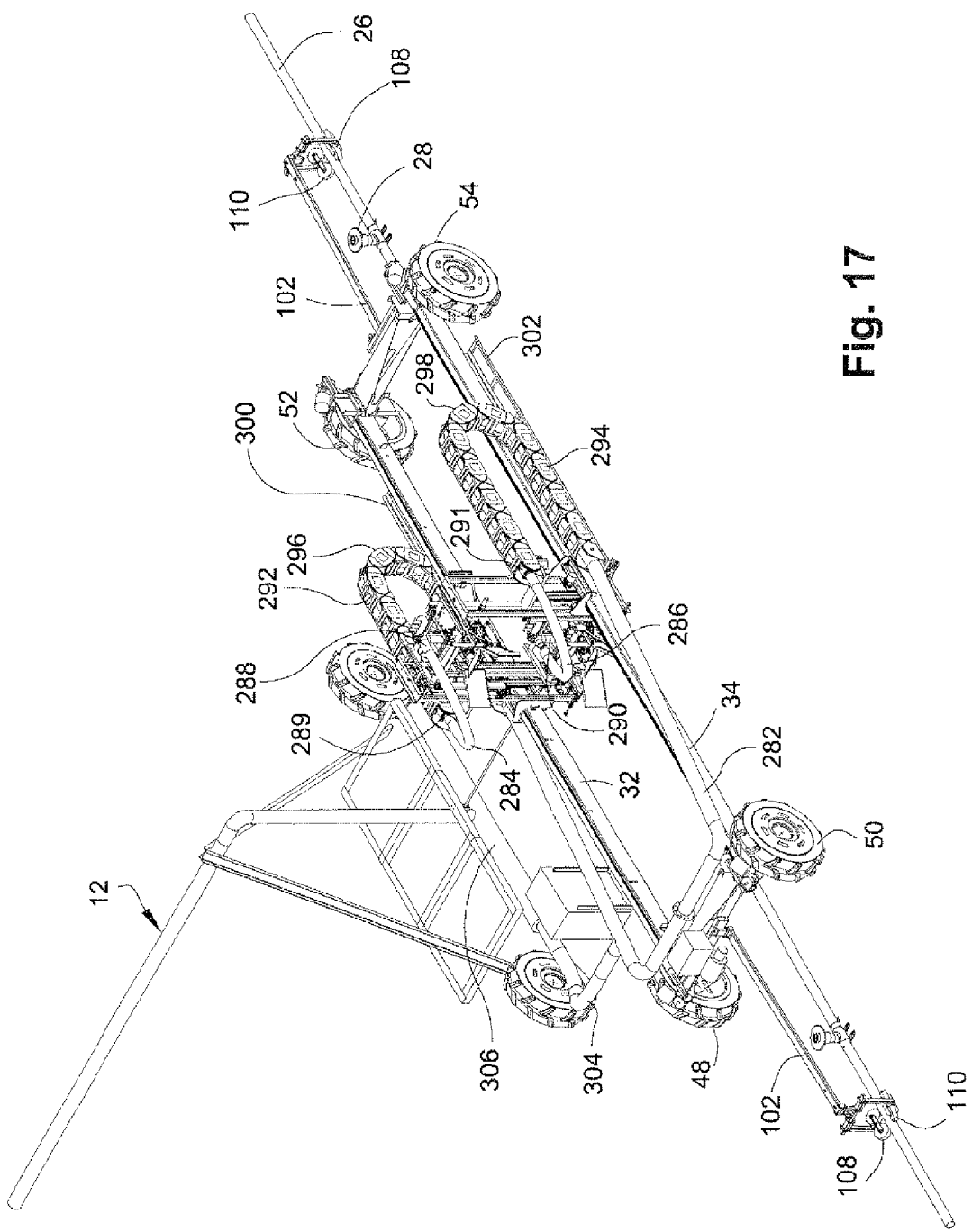
FIG. 17 is a perspective view of the cart similar to FIG. 2 but with the pair of ADS units in a leap frog position.
Figure 18:
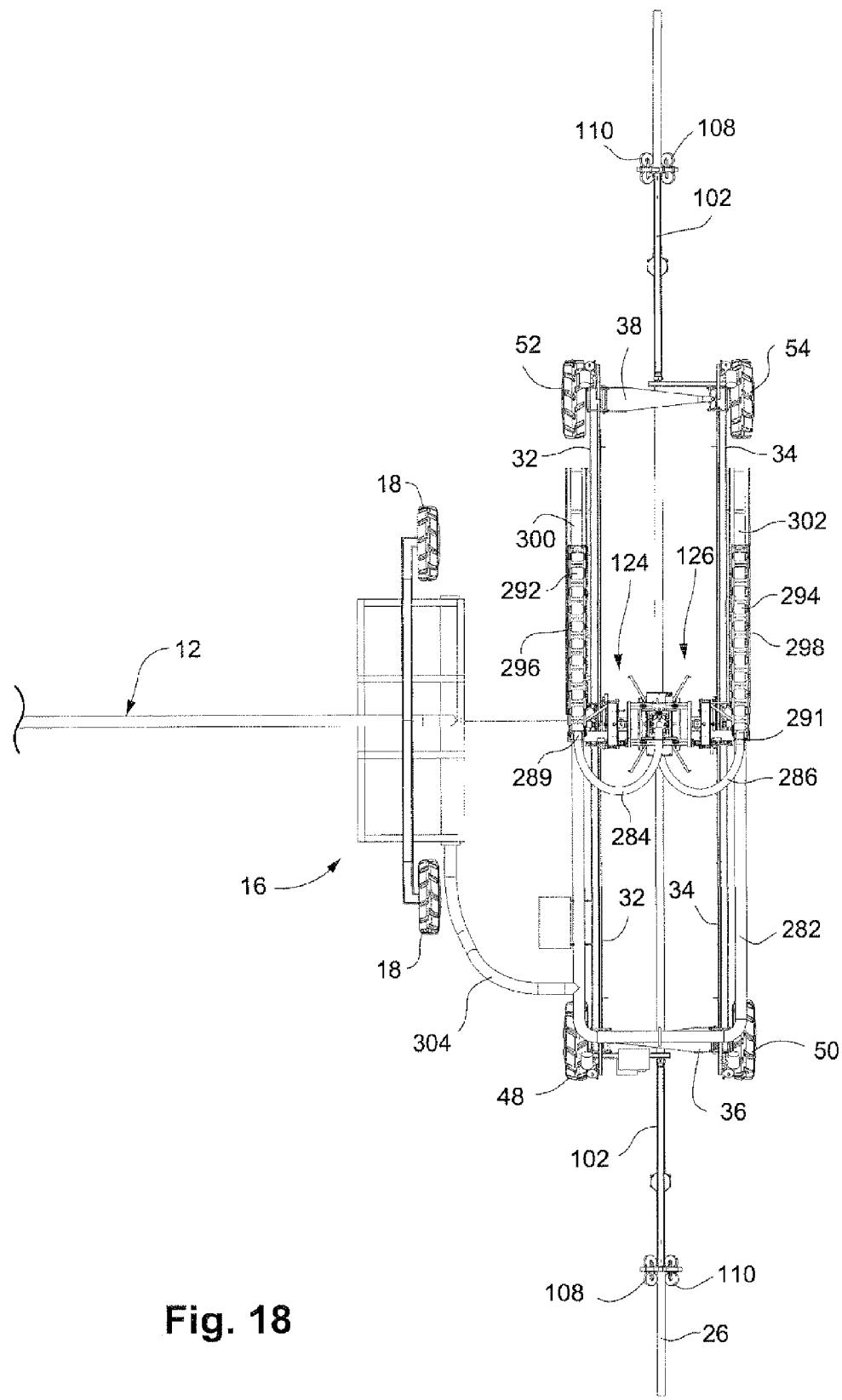
FIG. 18 is a top plan view of the cart shown in FIG. 17.
Figure 20A:
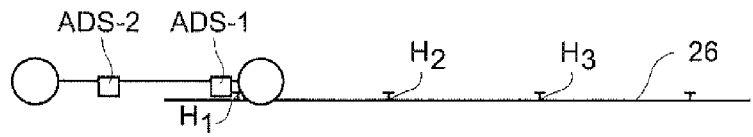
FIGS. 20A through 20K are schematic representations of the various steps in the engagement of successive water supply hydrants by the ADS units.
Figure 20B:
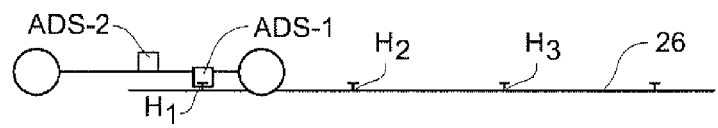
Figure 20C:
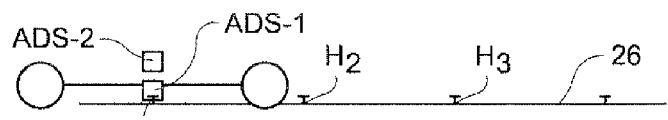
Figure 20D:
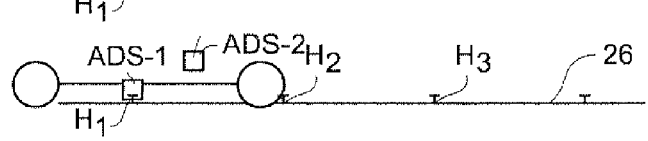
Figure 20E:
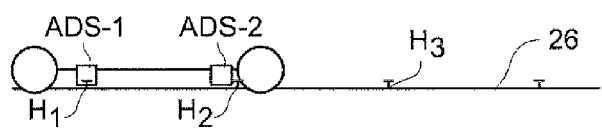

As the cart 30 approaches the first of the line of hydrants 28, on, for example, 20-ft. spacing, the forward ADS 126 is in its lowered (or docking) position at the forward end of the cart (FIGS. 1-3 and 20A). The rearward ADS 124 is located nearer the rearward end of the cart (FIG. 20A). ADS 126 will engage and dock with the first hydrant 28 (or H1). The cart 30 may be programmed to stop while the valve actuator of ADS 126 is inserted into the H1 hydrant valve, opens the valve and starts the flow of water through the hoses 286, 292 extending from ADS 126 to the manifold 282 that connects to the linear water distribution manifold 306 via hose or pipe 304. Alternatively, the cart may continue to move forward during opening and closing of the hydrant valve. If stopped, the cart 30 resumes movement in the first direction when the flow of water is commenced. Now, in order for ADS 126 to remain stationary relative to the hydrant 28 as the cart 30 moves forward, trolley 122 and ADS 126 are driven rearwardly (i.e., in a second and opposite direction) at the same speed, along its respective cart side beam 34 (FIG. 20B). This rearward movement is commenced as a result of rotation of the guide post 166 and subsequent movement of the spool valve 182 as described above. As ADS 126 moves rearwardly (along the cart centerline) the trolley 120 and the rearward ADS 124 are driven forwardly (also along the cart centerline) at a relatively high speed. At some specified location (or at some sensed distance from trolley 122), ADS 124 will be raised on its guide post to a level higher than the uppermost part of the ADS 126 (and trolley 120). In a presently preferred arrangement, ADS 124 will be raised immediately upon reaching the rearward end of the cart. ADS 124 will thus pass over ADS 126 as it moves toward the front end of the cart (FIGS. 17, 18, 20C and D). In other words, ADS 124 "leapfrogs" over ADS 126 as the former moves to the front end of the cart. ADS 124 will then be lowered on its guide post to its normal docking height (FIG. 20E). Here again, the exact location where the ADS 124 is lowered on its guide post may vary, so long as it clears ADS 126 and has sufficient time to align with the second hydrant 28 (or H2). In a presently preferred arrangement, ADS 124 will be lowered when it reaches its limit of movement at the forward end of the cart.

Figure 19:
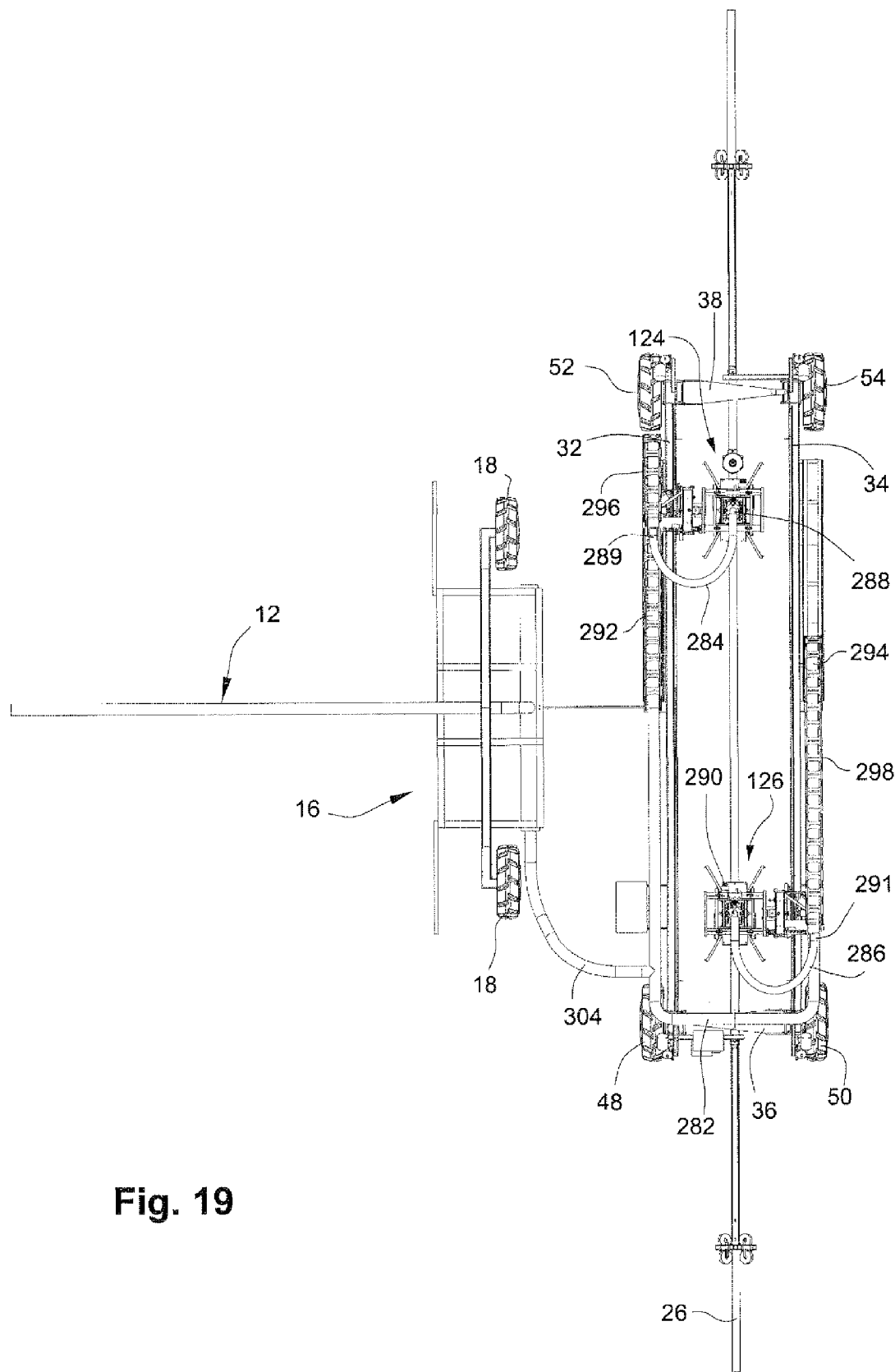
FIG. 19 is a top plan view of the cart similar to FIGS. 1 and 18, but with the second ADS unit in the lead position and the first ADS unit in the trailing position.
Figure 20F:
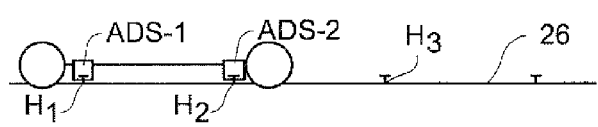
Figure 20G:
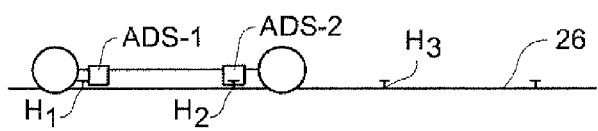
Figure 20H:
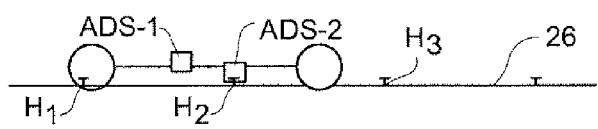
Figure 20I:
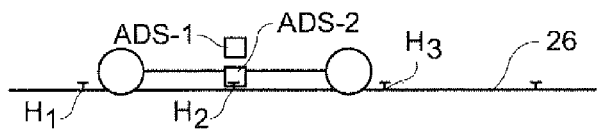
Figure 20J:
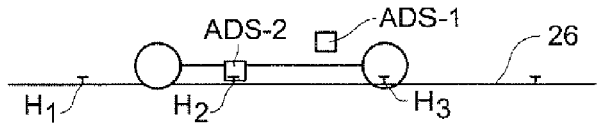
Figure 20K:
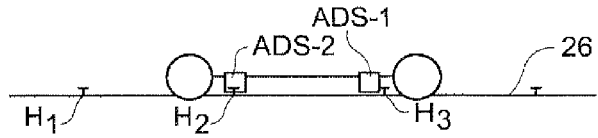

As the cart 30 continues in the forward direction, ADS 124 will engage and dock with the second hydrant H2 (FIGS. 19 and 20F). The cart 30 may again pause (or, alternatively, continue) while the valve actuator of the ADS 124 is inserted into and opens the valve on the second hydrant H2. ADS 126 remains engaged with the first hydrant H1 until water begins to flow from the second hydrant H2 to the linear irrigator 10. At that time, ADS 126 (now at the rearward end of the cart) will disengage the first hydrant H1 (FIG. 20G) and be raised to its free travel position (FIG. 20H). If stopped, the cart 30 will then move forward while the second trolley 120 and ADS 124 are driven rearwardly at the same speed to maintain ADS 124 stationary relative to the stationary second hydrant H2 (FIG. 20H) At the same time, trolley 122 and ADS 126 are driven forwardly at a speed faster than the cart speed, and it leapfrogs ADS 124 as described above, and moves to engage the third hydrant 28, or H3, (FIGS. 20I-K). Note that the hydraulic system drives the ADS units forwardly independently of the spool valve 182 which is used only upon engagement with a hydrant to cause the respective trolleys to be driven in the rearward direction, opposite the direction of movement of the linear irrigator and/or cart. This leapfrogging operation is repeated for each hydrant 28 until the linear irrigator 10 reaches the end of its path or is otherwise halted.

For each ADS unit, when it disengages from a hydrant, a check valve CV (See FIG. 11) will shut off the ADS so that no water supplied to the other (now engaged) ADS will flow back through the manifold 282 to exit the disengaged ADS.

Figure 22:
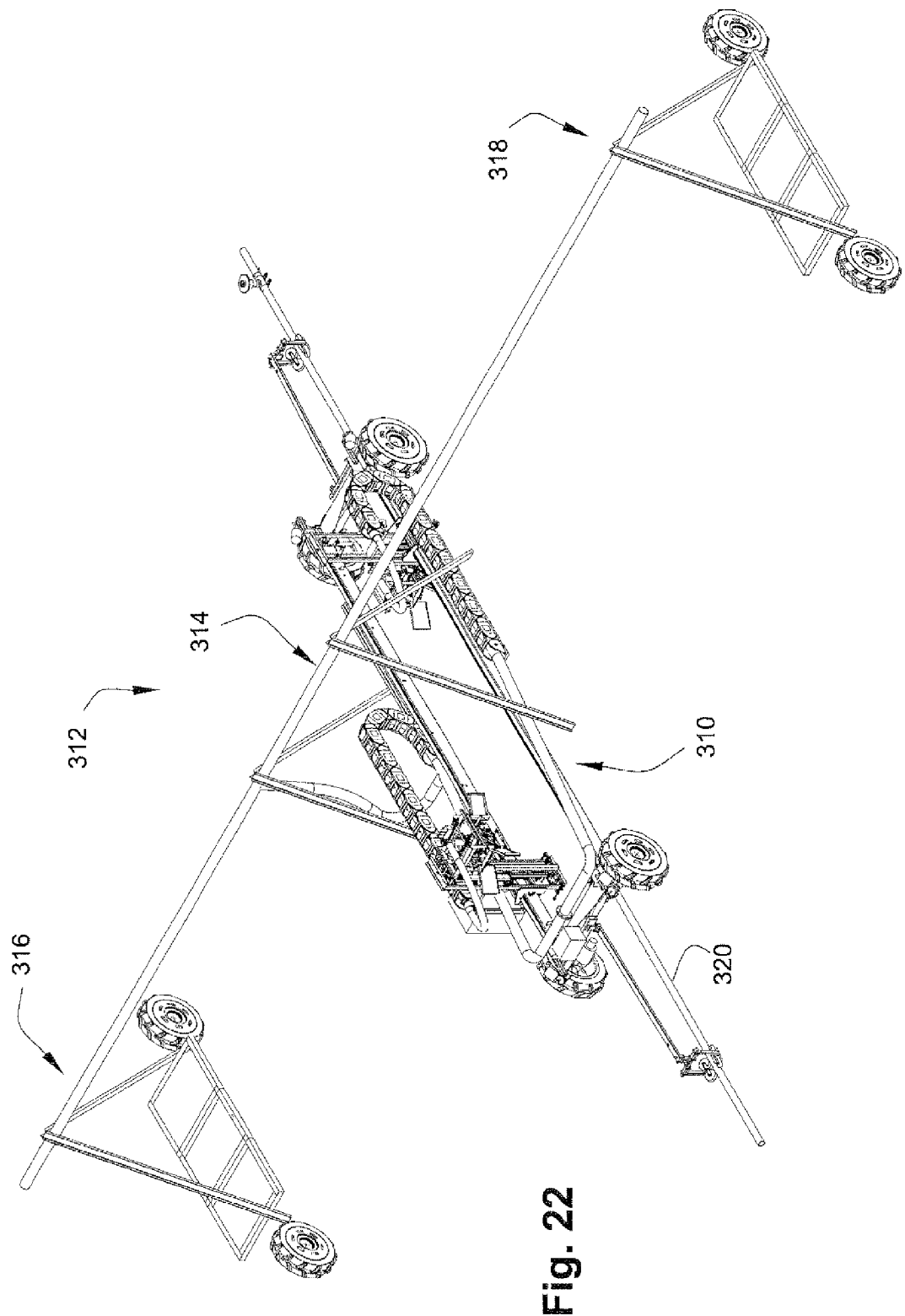
FIG. 22 is a perspective view of an alternative embodiment where the ADS units are incorporated into a linear irrigator.

It will be appreciated that various modifications are contemplated that are nevertheless within the scope of the invention. For example, and with reference to FIG. 22, a cart 310, with suitable minor modifications well within the skill of the art, could be incorporated into the linear irrigator 312 as a center (or any other) tower 314 located between adjacent towers 316, 318. The supply pipe 320 in this configuration extends below the center tower 314 rather than adjacent an end tower in the previously described embodiment. It will be appreciated that all features described herein are equally applicable to both separate and integrated cart configurations.

Figure 23:
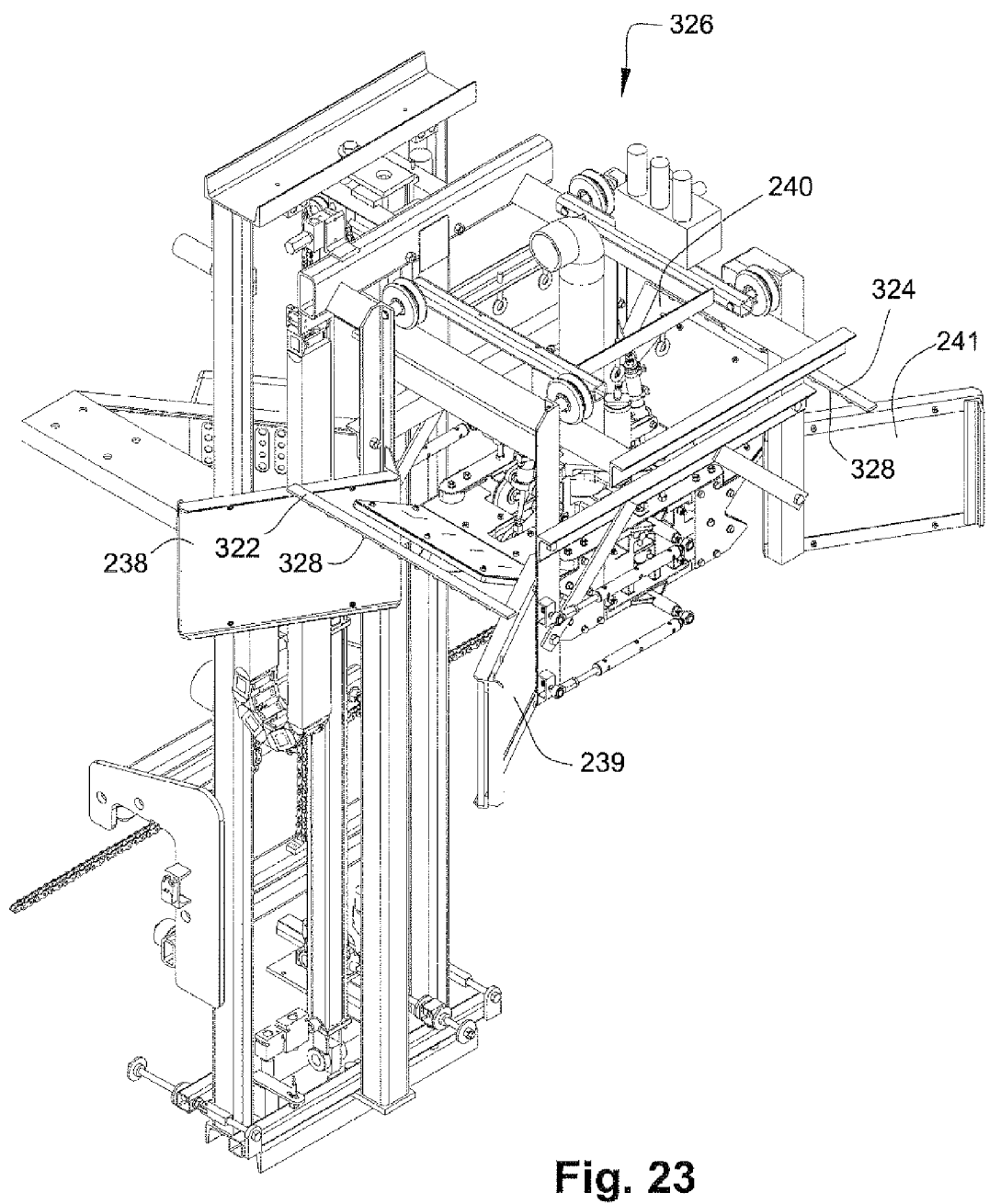
FIG. 23 is a perspective view of an ADS unit fitted with ultrasonic sensors in accordance with an alternative embodiment.

In another alternative arrangement shown in FIG. 23, ultrasonic distance sensors could be mounted along the underside of transversely-oriented strips or rods 322, 324 extending between the guide wings 238, 239 and 240, 241 of the ADS unit 326. The ultrasonic distance sensors 328 would be used instead of the trolley up-and-down sensors 278, 280 and would be used not only for ADS height control on the respective trolleys, but also for steering the cart. In addition, with an ADS unit 124 (and/or 126) in its "down" position, the ultrasonic distance sensors could be used to adjust the ADS units to uneven ground contours in an active-terrain-following mode.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method for continuously supplying water to a linear irrigator from a plurality of hydrants and associated hydrant valves spaced along a path of travel of the linear irrigator, the method comprising:
    (a) driving the linear irrigator in a first direction along the path of travel;
    (b) providing a pair of docking stations supported on a mobile cart adapted for movement with the linear irrigator, said mobile cart provided with first and second parallel side beams connected by a pair of end beams, said pair of docking stations each independently supported on a trolley separately and independently movable in first and second opposite directions on said first and second parallel side beams, respectively, each docking station equipped with a hydrant valve actuator and a hose for connecting said hydrant valve to the linear irrigator, and each trolley having a motor that drives its respective trolley axially along the first and second parallel side beams between the end beams;
    (c) moving a first of said docking stations and its respective trolley along said first side beam into engagement with a first of said hydrants and opening a first hydrant valve with said hydrant valve actuator to thereby supply water to said linear irrigator from said first hydrant;
    (d) continuing to move said mobile cart in said first direction while said first docking station is engaged with said first hydrant so that, relative to said mobile cart, said first docking station is moving in said second opposite direction;
    (e) as said first docking station moves relatively in said second, opposite direction on said first side beam, moving a second of said pair of docking stations on its respective trolley independent of said first docking station along said second side beam in said first direction toward a second hydrant, and enabling said second docking station to move vertically on its respective trolley relative to said second side beam to a height above said first docking station to thereby leapfrog said first docking station;
    (f) moving said second docking station into engagement with the second hydrant and opening the second hydrant valve with a second hydrant valve actuator to thereby supply water to said linear irrigator from the second hydrant;
    (g) disengaging said first docking station from the first hydrant and moving said first docking station and its respective trolley independent of said second docking station along first side beam in said first direction toward a third hydrant, and, as said second docking station and its respective trolley moves relatively in said second opposite direction on said second side beam while engaged with said second hydrant, enabling said first docking station to move vertically on its respective trolley relative to said first side beam independent of said second docking station to a height above said second docking station to thereby leapfrog said second docking station; and
    (h) substantially repeating steps (c) through (g) for engaging successive adjacent ones of said plurality of hydrants following said third hydrant.

2. The method of claim 1 wherein said linear irrigator comprises plural mobile towers, and wherein step (b) further comprises incorporating said mobile cart into one of said mobile towers.

3. The method of claim 1 including, during step (c), continuing movement of said mobile cart while said first hydrant valve is opened by said first hydrant valve actuator.

4. The method of claim 1 including, after step (e) lowering said second docking station to a docking height.

5. The method of claim 1 including, before step (f) lowering said second docking station to a docking height.

6. The method of claim 1 including providing sensing means for detecting and correcting deviations of said mobile cart from said path of travel.

7. The method of claim 1 including repeating steps (c) through (g) until all of said plurality of said hydrants have been engaged by one or the other of said first and second docking stations.

8. The method of claim 1 wherein said mobile cart is supported on plural wheels, each driven by a motor, and wherein correcting deviations in movement of said mobile cart relative to the linear irrigator is carried out by skid-steering said cart.

9. A method for continuously supplying water to a linear irrigator from a plurality of hydrants and associated hydrant valves spaced along a path of travel of the linear irrigator, the method comprising:
  (a) driving the linear irrigator in a first direction along the path of travel;
  (b) providing a pair of docking stations supported on a mobile cart for movement along side the linear irrigator, each docking station equipped with a hydrant valve actuator and a hose for connecting said hydrant valve to the linear irrigator, and each docking station independently moveable relative to said mobile cart, and wherein said mobile cart is provided with steering arms extending forwardly and rearwardly of said mobile cart and engaged with said supply pipe;
  (c) moving a first of said docking stations into engagement with a first of said hydrants and opening a first hydrant valve with said hydrant valve actuator to thereby supply water to said linear irrigator from said first hydrant;
  (d) continuing to move said mobile cart in said first direction while said first docking station is engaged with said first hydrant so that, relative to said elongated framework, said first docking station is moving in a second opposite direction;
  (e) as said first docking station moves in said second, opposite direction, moving a second of said pair of docking stations in said first direction toward a second hydrant, and enabling said second docking station to leapfrog said first docking station;
  (f) moving said second docking station into engagement with the second hydrant and opening the second hydrant valve with a second hydrant valve actuator to thereby supply water to said linear irrigator from the second hydrant;
  (g) disengaging said first docking station from the first hydrant and moving said first docking station in said first direction toward a third hydrant, and, as said second docking station moves in said second opposite direction while engaged with said second hydrant, enabling said first docking station to leapfrog said second docking station; and
  (h) substantially repeating steps (c) through (g) for engaging successive adjacent ones of said plurality of hydrants following said third hydrant.

* * * * *